(12) United States Patent
Umeda et al.

(10) Patent No.: US 8,664,152 B2
(45) Date of Patent: Mar. 4, 2014

(54) POROUS CELLULOSE GEL, METHOD FOR PRODUCING THE SAME AND USE THEREOF

(75) Inventors: Yasuto Umeda, Tokyo (JP); Yasuo Matsumoto, Tokyo (JP); Masami Shiina, Tokyo (JP); Masami Todokoro, Tokyo (JP); Yoshihiro Matsumoto, Tokyo (JP)

(73) Assignee: JNC Corporation, Tokyo (JP)

(*) Notice: Subject to any disclaimer, the term of this patent is extended or adjusted under 35 U.S.C. 154(b) by 270 days.

(21) Appl. No.: 12/199,715

(22) Filed: Aug. 27, 2008

(65) Prior Publication Data

US 2009/0062118 A1 Mar. 5, 2009

(30) Foreign Application Priority Data

Aug. 31, 2007 (JP) .................................. 2007-225222
Mar. 12, 2008 (JP) .................................. 2008-062992

(51) Int. Cl.
*B01J 20/291* (2006.01)
*B05D 5/00* (2006.01)

(52) U.S. Cl.
USPC ............. 502/404; 427/244; 427/339; 536/57; 536/61; 536/58

(58) Field of Classification Search
USPC ............. 502/404; 536/57, 56, 84, 98; 195/63; 525/54.21, 54.1; 527/300; 427/244, 427/339, 2; 106/502, 404; 530/403, 404, 530/405
See application file for complete search history.

(56) References Cited

U.S. PATENT DOCUMENTS

| | | | | |
|---|---|---|---|---|
| 4,665,164 A | | 5/1987 | Pernemalm et al. | 536/120 |
| 4,946,953 A | * | 8/1990 | Okuma et al. | 536/57 |
| 5,245,024 A | * | 9/1993 | Scarpa et al. | 536/56 |
| 5,492,723 A | * | 2/1996 | Sanderson et al. | 427/244 |

FOREIGN PATENT DOCUMENTS

| | | |
|---|---|---|
| GB | 1026706 | 4/1966 |
| JP | 43-10059 | 4/1943 |
| JP | 60-39558 | 3/1985 |
| JP | 01-217041 | 8/1989 |
| JP | 11-315164 | 11/1999 |
| JP | 2000-508361 | 7/2000 |
| WO | WO 97/38018 | 10/1997 |

* cited by examiner

*Primary Examiner* — James J Seidleck
*Assistant Examiner* — S. Camilla Pourbohloul
(74) *Attorney, Agent, or Firm* — Hogan Lovells US LLP

(57) ABSTRACT

The present invention provides a porous cellulose gel having a high mechanical strength capable of being operated at a higher flow rate, and a method for producing the same. To a suspension liquid of cellulose particles, a crosslinking agent in an amount of from 4 to 12 times the amount of the cellulose monomer in terms of moles and an alkali in an amount of from 0.1 to 1.5 times the amount of the crosslinking agent in terms of moles are added continuously dropwise or added dividedly over a prescribed period of time, whereby flow rate characteristics of a resulting porous cellulose gel can be enhanced. According to the invention, the production efficiency of a polymer substance, such as a nucleic acid and a protein can be enhanced.

8 Claims, 9 Drawing Sheets

POROUS CELLULOSE GEL, METHOD FOR PRODUCING THE SAME AND USE THEREOF

CROSS REFERENCE TO RELATED APPLICATIONS

This application claims priority under 35 U.S.C. §119 to Japanese Patent Application No. JP 2007-225222, filed on Aug. 31, 2007 and to Japanese Patent Application No. JP 2008-062992, filed on Mar. 12, 2008, which applications are expressly incorporated herein by reference in its entirety.

BACKGROUND OF THE INVENTION

1. Field of the Invention

The present invention relates to a porous cellulose gel containing crosslinked cellulose particles as a base material, and a method for producing the same. More specifically, the invention relates to a porous cellulose gel that is favorably used as a filler for chromatography.

2. Background Art

A porous cellulose gel contains cellulose particles having a solvent filled in a network structure of cellulose molecules of the cellulose gel, and is highly appreciated as being useful as a filler for various kinds of chromatography. In recent years, protein preparations represented by antibody drugs are improved in productivity through mass fermentation and high fermentation titer, and associated thereto, improvement in productivity is also demanded in purifying process including chromatography and the like. However, a conventional porous cellulose gel is poor in strength and is liable to suffer consolidation of particles in a column, which brings about practical difficulty in use at a high flow rate. Accordingly, such attempts have been made that a cellulose gel is improved in strength by subjecting to a crosslinking treatment.

Various methods have been known for crosslinking cellulose particles, and a method of acting a crosslinking agent in the presence of an alkaline substance is ordinarily employed owing to easiness in crosslinking operation, stability of crosslinked part after crosslinking, and nonionicity of cellulose particles. For example, Japanese Patent No. Sho 43-10059 discloses such a method that powder of cellulose particles is treated with a sodium hydroxide solution to form alkali cellulose, which is then treated with epichlorohydrin. In the method, however, the crystalline structure of the cellulose particles is broken, whereby the mechanical strength of the particles is significantly deteriorated.

As a crosslinking method of an agarose gel, Japanese National-Phase PCT Laid-Open Patent Publication No. 2000-508361 discloses that after reacting agarose with an epoxy group of allyl glycidyl ether to form a gel, an allyl group of allyl glycidyl ether is activated and crosslinked with the polysaccharide, so as to improve the mechanical strength of the crosslinked agarose gel. Japanese Laid-Open Patent Publication No. Sho 60-39558 discloses that an agarose gel is crosslinked with a bifunctional or polyfunctional crosslinking agent having a chain length of from 6 to 12 in the first step, and then crosslinked with a bifunctional crosslinking agent having a chain length of from 2 to 5 in the second step, whereby the mechanical strength of the crosslinked agarose gel can be improved.

However, such a method has not yet been known that a cellulose gel is improved in mechanical strength in an extent that sufficiently resolves the problems in the production process of protein drugs.

SUMMARY OF THE INVENTION

Under the circumstances, a porous cellulose gel that has a high mechanical strength capable of being used at a high flow rate, and a method for producing the porous cellulose gel are being demanded.

As a result of earnest investigations made by the inventors for solving the problems, it has been found that a crosslinking agent and an alkali in a prescribed molar ratio are added to a suspension liquid of raw material cellulose particles over a prescribed period of time or more, whereby a porous cellulose gel that has a high mechanical strength and is excellent in resistance to flow can be obtained, and thus the invention has been completed.

The invention relates to a porous cellulose gel, a method for producing the same, and use thereof shown below.

(1) A porous cellulose gel containing crosslinked cellulose particles having a solvent contained therein, upon filling the gel in a chromatography column having an inner diameter of 2.2 cm to a height of 17.5±2.5 cm, a linear velocity of water at 20° C. being from approximately 2,400 to approximately 4,500 cm/hour at a pressure of 0.4 MPa.

(2) A porous cellulose gel containing crosslinked cellulose particles having a solvent contained therein, upon filling the gel in a chromatography column having an inner diameter of 2.2 cm to a height of 17.5±2.5 cm, a maximum linear velocity of water at 20° C. being from approximately 2,400 to approximately 5,500 cm/hour.

(3) The porous cellulose gel as in the item (1) or (2), wherein the crosslinked cellulose particles have a particle diameter of from approximately 1 to approximately 2,000 µm.

(4) The porous cellulose gel as in one of items (1) to (3), wherein the porous cellulose gel has an exclusion limit molecular weight with polyethylene glycol of from approximately 1,000,000 to approximately 5,000,000.

(5) The porous cellulose gel as in one of items (1) to (4), wherein the crosslinked cellulose particles have a swelling degree of from approximately 5 to approximately 20 mL/g.

(6) The porous cellulose gel as in one of items (1) to (5), wherein the crosslinked cellulose particles have a reswelling degree of from approximately 80 to approximately 100%.

(7) A method for producing a porous cellulose gel, the method containing a step of adding continuously dropwise or adding dividedly, to a suspension liquid of non-crosslinked cellulose particles, a crosslinking agent in an amount of from approximately 4 to approximately 12 times an amount of a cellulose monomer in terms of moles and an alkali in an amount of from approximately 0.1 to approximately 1.5 times the amount of the crosslinking agent in terms of moles, in the presence of at least one inorganic salt selected from the group consisting of a hydrochloride, a sulfate, a phosphate and a borate, in an amount of from approximately 6 to approximately 20 times the amount of the cellulose monomer in terms of moles, over approximately 3 hours or more.

(8) The method as in the item (7), wherein the amount of the crosslinking agent used is from approximately 4 to approximately 9 times the amount of the cellulose monomer in terms of moles.

(9) The method as in the item (7), wherein the total amount of the crosslinking agent and the alkali used is divided into n portions (wherein n is an integer of from 2 to 4), and the adding step is repeated n times for each portion, to provide the porous cellulose gel as in one of the items (1) to (6).

(10) The method as in the item (9), wherein the total amount of the crosslinking agent used is from approximately 6 to approximately 12 times the amount of the cellulose monomer in terms of moles.

(11) The method as in one of the items (7) to (10), wherein the suspension liquid of non-crosslinked cellulose particles has an initial alkali concentration of 1% by weight or less.

(12) A filler for chromatography containing the porous cellulose gel as in one of the items (1) to (6).

(13) A porous cellulose gel derivative containing the porous cellulose gel as in one of the items (1) to (6), in which hydroxyl groups are substituted at least partially with groups containing sulfuric acid group or sulfonic acid group.

(14) A filler for chromatography containing the porous cellulose gel derivative as in the item (13).

According to the invention, such a porous cellulose gel is provided that has a high mechanical strength and is excellent in resistance to flow. According to a preferred embodiment of the invention, the porous cellulose gel of the invention has a particle diameter thereof of from approximately 1 to approximately 2,000 μm and an exclusion limit molecular weight thereof of approximately 1,000,000 or more as measured with polyethylene glycol, and thus the porous cellulose gel is excellent in separation and purification capability of a biological polymer, such as a protein, upon using as a filler for chromatography.

According to a preferred embodiment of the invention, the porous cellulose gel of the invention is excellent in mechanical strength, and thus the porous cellulose gel can be applied to various kinds of reactions, and the hydroxyl groups in the gel can be substituted with various kinds of reactive functional groups. Introduction of intended reactive functional groups to the porous cellulose gel imparts affinity with a specific compound to the gel, thus the resulting porous cellulose gel derivative can be used favorably as a filler for chromatography.

According to a preferred embodiment of the invention, the porous cellulose gel of the invention has a reswelling degree close to 100%, and thus hydrophobic reaction can be easily carried out in an organic solvent by drying the gel. Furthermore, bacteria can be prevented from multiplying since the gel can be dried upon storing.

The porous cellulose gel of the invention can be produced in a convenient manner according to the method of the invention. According to a preferred embodiment of the invention, a porous cellulose gel having an intended exclusion limit molecular weight can be produced with suppressing decrease of the exclusion limit molecular weight due to crosslinking while the intended mechanical strength is attained.

BRIEF DESCRIPTION OF THE DRAWINGS

The accompanying drawing, which is included to provide a further understanding of the invention and is incorporated in and constitutes a part of this specification, illustrates embodiments of the invention and together with the description serves to explain the principles of the invention. In the drawing.

DETAILED DESCRIPTION OF THE PREFERRED EMBODIMENTS

Figure 1:
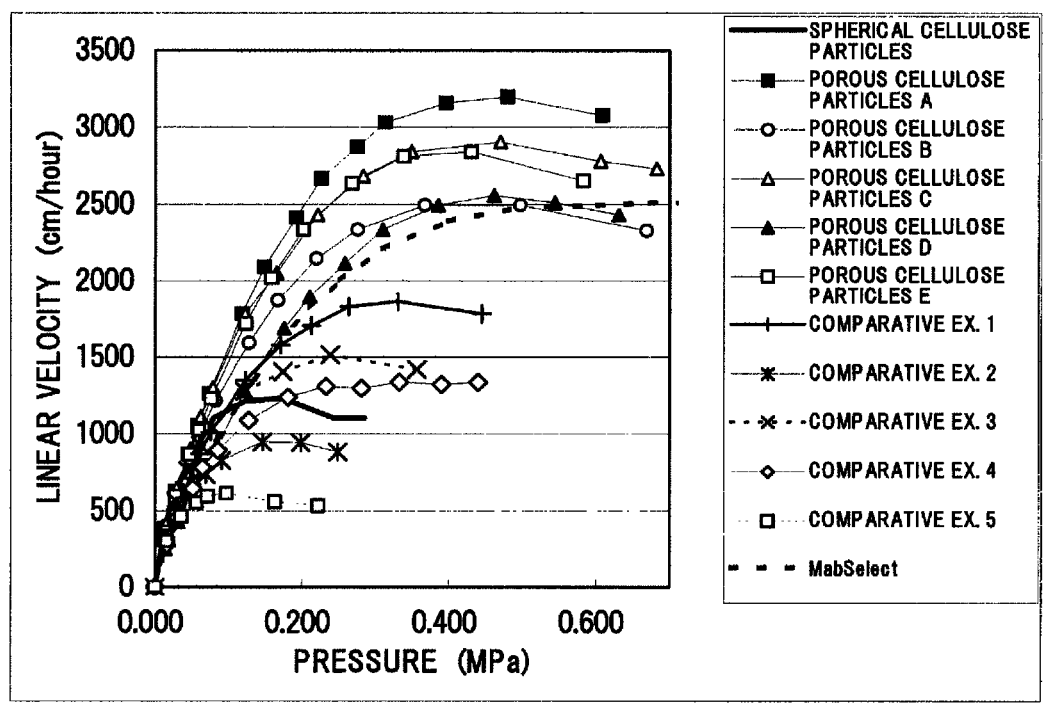
FIG. 1 is a graph showing relationship between the pressure and the linear velocity of the porous cellulose gel obtained in Example 1.

The porous cellulose gel, the method for producing the same, and the use thereof of the invention will be described in detail below.

1. Porous Cellulose Gel

The porous cellulose gel of the invention will be described. The porous cellulose gel of the invention includes two embodiments, which are different in definition method of the linear velocity. The porous cellulose gel according to the first embodiment of the invention contains crosslinked cellulose particles having a solvent contained therein, and upon filling the gel in a chromatography column having an inner diameter of 2.2 cm to a height of 17.5±2.5 cm, the linear velocity of water at 20° C. is from approximately 2,400 to approximately 4,500 cm/hour at a pressure of 0.4 MPa. In the porous cellulose gel according to the second embodiment of the invention, the maximum linear velocity of water at 20° C. is from approximately 2,400 to approximately 5,500 cm/hour upon filling the gel in a chromatography column having an inner diameter of 2.2 cm to a height of 17.5±2.5 cm.

One of the characteristic features of the porous cellulose gel of the invention is that the gel exhibits a certain linear velocity upon measuring by the prescribed method. The term "linear velocity" herein is an index expressing strength of a gel used as a filler for chromatography, and the use of a filler for chromatography having a larger linear velocity increases the processing speed of chromatography. In chromatography, generally, the particle diameter is decreased or the flow rate is increased for improving the separation and purification capability and the processing speed of an analyte, whereby the interior of the column is pressurized. In this case, consolidation of the gel is observed at a lower linear velocity in a softer gel, and the linear velocity is not increased beyond the value where the consolidation occurs, but only the pressure is increased. On the other hand, a harder gel is prevented from suffering consolidation at a higher linear velocity, and the linear velocity is increased along with increase of the pressure. In other words, with a gel having a higher mechanical strength, the linear velocity is increased upon pressurizing without occurrence of consolidation, and thus the gel is favorable as a filler for chromatography. In the invention, a porous cellulose gel having an intended mechanical strength is determined by the linear velocity at a pressure of 0.4 MPa and the maximum linear velocity.

The porous cellulose gel of the invention contains crosslinked cellulose particles having a solvent contained therein. The expression "crosslinked cellulose particles having a solvent contained therein" means that the crosslinked cellulose molecules form a three-dimensional network structure, and the network structure is swollen by absorbing the solvent therein. The crosslinking within the cellulose particle is generally attained between a free hydroxyl group of the cellulose molecule within each cellulose particle and a functional group of the crosslinking agent.

In the porous cellulose gel of the invention, the solvent contained in the crosslinked cellulose particles is not particularly limited. In the case, for example, that the porous cellulose gel of the invention is used as a filler for chromatography, the solvent is preferably the same solvent as used as a mobile phase. In the case, for example, that the porous cellulose gel is produced by the method for producing a porous cellulose gel according to the invention described later, the solvent absorbed in the crosslinked cellulose is generally water, and the solvent adsorbed in the crosslinked cellulose can be replaced by various kinds of solvents through a solvent substitution operation or the like.

In the first embodiment of the invention, the porous cellulose gel has a linear velocity of water at 20° C. of from approximately 2,400 to approximately 4,500 cm/hour at a pressure of 0.4 MPa upon filling the gel in a chromatography column having an inner diameter of 2.2 cm to a height of 17.5±2.5 cm. The linear velocity is preferably from approximately 2,450 to approximately 4,400 cm/hour, and more preferably from approximately 2,500 to approximately 4,200 cm/hour. As shown in Example 1 described later, a non-crosslinked cellulose gel has a linear velocity of approximately 1,000 cm/hour under the same conditions. On the other hand, the porous cellulose gel of the invention has a linear velocity of several times that of the non-crosslinked cellulose gel, whereby the processing speed of chromatography can be significantly improved.

Alternatively, the porous cellulose gel of the invention is characterized by showing the maximum linear velocity of water at 20° C. upon filling the gel in a chromatography column having an inner diameter of 2.2 cm to a height of 17.5±2.5 cm as described in the second embodiment. Specifically, in the second embodiment of the invention, the porous cellulose gel has a maximum linear velocity of water at 20° C. of from approximately 2,400 to approximately 5,500 cm/hour upon filling the gel in a chromatography column having an inner diameter of 2.2 cm to a height of 17.5±2.5 cm. The linear velocity is preferably from approximately 2,550 to approximately 5,450 cm/hour, and more preferably from approximately 2,600 to approximately 5,400 cm/hour. A gel bed is generally pressurized for attaining the maximum linear velocity, and when the pressure is too high, the particles are broken to cause consolidation, which disables the function as a filler for chromatography. Accordingly, the pressure applied to the gel bed for attaining the maximum linear velocity is preferably about from approximately 0.5 to approximately 0.8 MPa.

In the invention, the porous cellulose gel is filled in a column to a height of 17.5±2.5 cm and used as an initial gel bed for measuring the linear velocity. While the height of the initial gel bed is expressed as "17.5±2.5 cm", substantially equivalent values are obtained for the linear velocity within an error range of ±2.5 cm. There is a tendency that the linear velocity is decreased when the height of the initial gel bed is increased. There is no technical significance in calculation of a linear velocity per 1 cm for the height of the initial gel bed, but for calculating the linear velocity with respect to the height of the initial gel bed more strictly, the linear velocity per 1 cm for the height of the initial gel bed is preferably from approximately 140 to approximately 350 cm/hour, more preferably approximately 145 to approximately 300 cm/hour, further preferably from approximately 150 to approximately 290 cm/hour, and particularly preferably from approximately 160 to approximately 280 cm/hour. Accordingly, the preferred linear velocity of the porous cellulose gel of the invention is a product of the linear velocity per 1 cm for the height of the initial gel bed and the height of the initial gel bed.

The linear velocity at a pressure of 0.4 MPa or the maximum linear velocity exhibited by the porous cellulose gel of the invention is equivalent to or more than that of "MabSelect" (registered trademark), produced by GE Healthcare Bio-Sciences Co., Ltd., produced with agarose gel as a raw material, which has been known as a hard gel, and thus the porous cellulose gel of the invention is highly useful.

The linear velocity of the column filled with a gel can be measured by the method disclosed in Jonathan J. Stickel and Alexandros Fotopoulos, Biotechnol. Prog., 2001, 17, 744-751, "Pressure-Flow Relationships for Packed Beds of Compressible Chromatography Media at Laboratory and Production Scale". A specific measuring method is shown in the examples described later.

The porous cellulose gel of the invention exhibits the excellent linear velocity, and it is preferred that the particle diameter of the crosslinked cellulose particles constituting the gel and the exclusion limit molecular weight of the gel are also within the intended ranges as a filler for chromatography.

The particle diameter of the crosslinked cellulose particles in the porous cellulose gel of the invention is preferably from approximately 1 to approximately 2,000 µm, more preferably from approximately 10 to approximately 500 µm, further preferably from approximately 20 to approximately 200 µm, and particularly preferably from approximately 50 to approximately 100 µm. The average particle diameter of the crosslinked cellulose particles is preferably from approximately 30 to approximately 1,000 µm, more preferably from approximately 40 to approximately 200 µm, and further preferably from approximately 50 to approximately 100 µm.

In the invention, the particle diameter of the crosslinked cellulose particles can be calculated from a particle diameter (arithmetic diameter) measured by an electric resistance method. The electric resistance method utilizes change in electric resistance between two electrodes occurring upon passing a particle through a sensitive area. Since the electric resistance is proportional to the volume of the particle, the change in electric resistance measured is converted to a particle diameter, which is designated as the particle diameter of the crosslinked cellulose particles.

In the invention, the average particle diameter of the crosslinked cellulose particles can be obtained as an average of the entire data of the arithmetic diameters thus measured. Examples of the measuring device used include a precision particle size distribution measuring device, "Multisizer 3", a product name, produced by Beckman Coulter, Inc.

In alternative, a particle diameter on an micrograph taken with an optical microscope is measured with a slide caliper or the like, and the original particle diameter can be calculated from the magnification of the micrograph. The average particle diameter can be calculated from the particle diameters of each particles obtained from the optical micrograph by the following expressions.

$$\text{number average particle diameter } (Mn) = \Sigma(nd)/\Sigma(n)$$

$$\text{volume average particle diameter } (Mv) = \Sigma(nd^4)/\Sigma(nd^3)$$

wherein nd represents the particle diameters of each particles obtained from the optical micrograph, and n represents the number of particles measured.

The exclusion limit molecular weight with polyethylene glycol of the porous cellulose gel of the invention is preferably from approximately 1,000,000 to approximately 5,000,000, more preferably from approximately 1,000,000 to approximately 4,000,000, and further preferably from approximately 1,000,000 to approximately 3,000,000. The porous cellulose gel of the invention has an exclusion limit molecular weight of approximately 1,000,000 or more and thus can exhibit a high resolution and a high adsorption capacity upon using as a filler for chromatography.

An exclusion limit molecular weight can be obtained from relationship between a molecular weight and an elution volume or column volume of a standard substance. A method for measuring an exclusion limit molecular weight is disclosed, for example, in "Seibutsukagaku Jikken-ho (Biochemical Experiments) 11, Gel Roka-ho (Gel Filtering Method), 2nd Ed.", published by Japan Scientific Societies Press Co., Ltd., and "Gel Filtration Principles and Methods", a reference material available from Amaersham Biosciences Corporation (which is currently GE Healthcare Bio-Sciences Co., Ltd.). A specific measuring method is shown in the examples described later.

The swelling degree (volume/weight of solid content in terms of mL/g) of the porous cellulose gel of the invention is preferably from approximately 5 to approximately 20 mL/g, more preferably from approximately 7 to approximately 17 mL/g, and further preferably from approximately 10 to approximately 15 mL/g. The reswelling degree with water of the porous cellulose gel of the invention after drying is preferably from approximately 80 to approximately 100%, more preferably from approximately 85 to approximately 100%, and further preferably from approximately 95 to approximately 100%. According to the preferred embodiment of the invention, the porous cellulose gel of the invention has a reswelling degree close to 100%, and thus hydrophobic reaction can be easily carried out in an organic solvent by drying the gel. Furthermore, bacteria can be prevented from multiplying since the gel can be dried upon storing.

The swelling degree of the gel can be measured in the following manner. A gel swollen with water is placed in a measuring cylinder and allowed to stand under intermittent application of vibration for making the volume thereof constant, and the volume of the gel is measured. The gel is then totally dried, and the dry weight of the gel is measured. The swelling degree of the gel is obtained by the following expression.

swelling degree (mL/g)=(volume of gel (mL))/(dry weight of gel (g))

The method for drying a gel is not particularly limited, and for example, the gel may be dried in a thermostatic chamber at 80° C. for 1 to 2 days.

The reswelling degree of the gel can be measured in the following manner. The dried gel used for measuring the swelling degree is again swollen with water, and the volume thereof is measured in the same manner as in the measurement of the swelling degree. The reswelling degree is obtained by the following expression.

reswelling degree(%)={(volume of reswollen gel after drying)/(volume of gel before drying)}×100

In the measurement of the swelling degree and the reswelling degree of the gel, the measurement of the volume of the gel may be carried out by using the same weight of a dry gel.

The porous cellulose gel of the invention is not particularly limited in production method thereof, and can be produced, for example, by the following method.

2. Method for Producing Porous Cellulose Gel

The method for producing a porous cellulose gel of the invention contains a step of adding continuously dropwise or adding dividedly, to a suspension liquid of non-crosslinked cellulose particles, a crosslinking agent in an amount of from approximately 4 to approximately 12 times an amount of a cellulose monomer in terms of moles and an alkali in an amount of from approximately 0.1 to approximately 1.5 times the amount of the crosslinking agent in terms of moles, in the presence of at least one inorganic salt selected from the group consisting of a hydrochloride, a sulfate, a phosphate and a borate, in an amount of from approximately 6 to approximately 20 times the amount of the cellulose monomer in terms of moles, over approximately 3 hours or more. The term "cellulose monomer" referred herein means a glucose unit, which is a constitutional unit of cellulose, and the moles of the cellulose monomer (i.e., the polymerization degree) is calculated from a dry weight of cellulose with the amount obtained by subtracting water content from one unit of glucose, i.e., 162 as molecular weight, being 1 mol.

It is considered in the method of the invention that the crosslinking reaction is carried out while slowly adding the prescribed amounts of the crosslinking agent and the alkali over a prolonged period of time to form a stable crosslinked structure of cellulose particles, whereby the mechanical strength of the resulting porous cellulose gel is improved to provide excellent resistance to flow.

The non-crosslinked cellulose particles used in the method of the invention are not particularly limited, and known products may be used. Among these, spherical cellulose particles having a relatively high mechanical strength are preferably used. Spherical cellulose particles having a sphericity of from approximately 0.8 to approximately 1.0 are preferably used.

Various proposals have been made for a method for producing non-crosslinked cellulose particles that can be used in the invention, and they may be employed without any particular limitation. For example, a method for producing spherical cellulose particles is disclosed in Japanese Patent No. Sho 55-39565, Japanese Laid-Open Patent Publication No. Sho 55-44312, Japanese Laid-Open Patent Publication No. Sho 51-5361 and the like. Commercially available products may be used. Examples thereof include Cellufine (registered trademark) series GC-15, GH-25, GC-100 and GC-200, available from Chisso Corporation, and Ceolus (registered trademark), PH grade and KG grade, available from Asahi Kasei Chemicals Corporation. Examples thereof also include Viscopearl (registered trademark) available from Rengo Co., Ltd. as cellulose particles regenerated from viscose, Perloza MT series available from Iontosorb s.r.o., and Cellulose, Beaded (catalog code #C8204) available from Sigma-Aldrich Corporation.

In the method of the invention, firstly, non-crosslinked cellulose particles are dispersed in a solvent to prepare a suspension liquid. The solvent is not particularly limited as far as the non-crosslinked cellulose particles can be dispersed therein, and any one of water, an organic solvent and a mixture of water and an organic solvent may be used. Examples of the organic solvent include an alcohol having from 1 to 8 carbon atoms, such as methanol, ethanol, propanol, butanol, pentanol and octanol; an ether having from 4 to 10 carbon atoms, such as ethyl ether, propyl ether, isopropyl ether, butyl ether, isobutyl ether, n-amyl ether, isoamyl ether, methyl propyl ether and methyl isopropyl ether; a ketone having from 3 to 5 carbon atoms, such as acetone, ethyl methyl ketone, methyl propyl ketone, methyl isopropyl ketone and diethyl ketone; an aliphatic hydrocarbon having from 6 to 10 carbon atoms, such as hexane, heptane, octane, nonane and decane; an alicyclic hydrocarbon having from 5 to 10 carbon atoms, such as cyclopentane, cyclohexane and cyclohexene; an aromatic hydrocarbon, such as benzene, toluene and xylene; and other organic solvents, such as dioxane, dimethylformamide, dimethylsulfoxide and ligroin. Among these, a water-soluble solvent is preferred, and water is particularly preferred.

The amount of the solvent used is not particularly limited, and the content of the non-crosslinked cellulose particles in the suspension liquid is preferably approximately 50% by volume or more.

It is preferred to make at least one inorganic salt selected from the group consisting of a hydrochloride, a sulfate, a phosphate and a borate present in the suspension liquid for enhancing the efficiency of the crosslinking reaction. Preferred examples of the inorganic salt include an alkali metal salt and an alkaline earth metal salt, such as sodium sulfate, magnesium sulfate, sodium chloride, magnesium chloride, sodium phosphate, sodium monohydrogen phosphate, sodium dihydrogen phosphate, sodium borate, potassium sulfate, lithium sulfate, potassium chloride and lithium chloride. In particular, sodium sulfate is preferred since it is inexpensive and is poor in reactivity with the crosslinking agent. In this case, the amount of the inorganic salt used is generally from approximately 6 to approximately 20 times, preferably from approximately 6 to approximately 12 times, and more preferably from approximately 6 to approximately 10 times, the amount of the cellulose particles in terms of moles.

Before adding a crosslinking agent and an alkali to the suspension liquid of the non-crosslinked cellulose particles, it is preferred to add small amounts of an alkali and sodium borohydride in advance for the purpose of reduction treatment. The initial alkali concentration is preferably approximately 1% or less by weight, and more preferably from approximately 0.65 to approximately 1% by weight, based on the total weight of the suspension liquid. The amount of sodium borohydride added is preferably from approximately 0.1 to approximately 10% by weight based on the dry weight of the cellulose. Before adding the alkali and sodium borohydride, it is preferred to subject the suspension liquid to a stirring treatment generally at a temperature of from approximately 35 to approximately 70° C., and preferably from approximately 40 to approximately 50° C., for a period of about from approximately 0.25 to approximately 1 hour. Owing to the stirring treatment, a suspension liquid having the non-crosslinked cellulose particles dispersed therein homogeneously can be obtained, and thus the crosslinking reaction can be carried out homogeneously.

A crosslinking agent and an alkali are then added to the suspension liquid.

The crosslinking agent used in the method of the invention is not particularly limited as far as it is a bifunctional one or a polyfunctional one. Preferred examples thereof include epichlorohydrin, dichlorohydrin, a bisepoxide compound (a compound containing at least one moiety represented by X—R—Y, wherein X and Y each independently represent halogen or epoxy, and R represents an aliphatic residual group having from 1 to 10 carbon atoms), epibromohydrin, epifluorohydrin, 2-(4-fluorophenyl)oxirane and ((4-fluorophenoxy)methyl)oxirane since they provide a chemically stable bond to cellulose and do not introduce a charged group capable of inducing undesirable adsorption upon reaction. Specific examples of the bisepoxide compound include the compounds disclosed in Japanese Laid-Open Patent Publication No. Sho 60-39558 and U.S. Pat. No. 4,665,164. These compounds may be used solely or in combination of two or more of them. Among these, epichlorohydrin, dichlorohydrin and epibromohydrin are preferably used in the invention since they are easily available and inexpensive.

The amount of the crosslinking agent used is from approximately 4 to approximately 12 times, preferably from approximately 4 to approximately 11 times, more preferably from approximately 4 to approximately 10 times, and further preferably from approximately 4 to approximately 9 times, the amount of the cellulose monomer in terms of moles. In the case where the amount of the crosslinking agent used in total is approximately 4 times or more the amount of the cellulose monomer in terms of moles, an intended resistance to flow can be obtained with only one step of crosslinking treatment.

Examples of the alkali used in the method of the invention include a hydroxide of an alkali metal, such as sodium hydroxide and potassium hydroxide, and a hydroxide of an alkaline earth metal, such as calcium hydroxide. Among these, sodium hydroxide and potassium hydroxide are preferred, and sodium hydroxide is particularly preferred, since a hydroxide of an alkali metal is good in solubility.

The amount of the alkali used is from approximately 0.1 to approximately 1.5 times, preferably from approximately 0.5 to approximately 1.25 times, and more preferably from approximately 0.75 to approximately 1 time, the amount of the crosslinking agent in terms of moles. The alkali is preferably used in the form of an aqueous solution by diluting with water. The alkali content of the alkali aqueous solution is preferably from approximately 1 to approximately 50% by weight, more preferably from approximately 20 to approximately 50% by weight, and further preferably from approximately 40 to approximately 50% by weight.

In the invention, the crosslinking agent and the alkali are added continuously dropwise or added dividedly to the suspension liquid of the non-crosslinked cellulose particles over approximately 3 hours or more. The term "added continuously dropwise" herein means that the crosslinking agent and the alkali are added to the suspension liquid in a continuous and dropwise manner, and the term "added dividedly" herein means that the crosslinking agent and the alkali are added to the suspension liquid by dividing the crosslinking agent and the alkali into plural portions.

It is sufficient that the period of time, over which the crosslinking agent and the alkali are added continuously dropwise or added dividedly to the suspension liquid, is 3 hours, and for improving the mechanical strength of the porous cellulose gel more efficiently by using same amount of the crosslinking agent and alkali, the period of time is preferably approximately 6 hours or more, but is preferably approximately 24 hours or less from the standpoint of productivity.

In the case where the crosslinking agent and the alkali are added dividedly, it is preferred that the crosslinking agent and the alkali are added after dividing into at least four portions with an interval of from approximately 10 to approximately 120 minutes among them. The interval and the number of times of the addition may be appropriately determined depending on the period of time for addition. For example, in the case where the crosslinking agent and the alkali are added dividedly over approximately 3 hours, the necessary amounts of the crosslinking agent and the alkali are preferably added after dividing into 13 portions with an interval of approximately 15 minutes. In the case where they are added dividedly over approximately 6 hours, the necessary amounts of the crosslinking agent and the alkali are preferably added after dividing into 4 portions with an interval of approximately 120 minutes, or in alternative, the necessary amounts of the crosslinking agent and the alkali are preferably added after dividing into 25 portions with an interval of approximately 15 minutes.

The amounts of the crosslinking agent and the alkali added at one time are not particularly limited, and it is preferred that constant amounts thereof are added within a certain period of time in a balanced manner. The interval of addition may not be constant but is preferably a substantially constant interval. The amounts thereof may not be constant but are preferably constant amounts. The crosslinking agent and the alkali are preferably added simultaneously from the standpoint of easiness in operation.

The interval of addition may be shortened, and the necessary amounts of the crosslinking agent and the alkali may be constantly added continuously dropwise over a prescribed period of time.

During the addition of the crosslinking agent and the alkali, it is preferred that the temperature of the reaction mixture is maintained at a temperature of from approximately 35 to approximately 70° C., and more preferably from approximately 40 to approximately 50° C., under continuously stirring.

After completing the addition of the necessary amounts of the crosslinking agent and the alkali, the reaction is further carried out for a period of from approximately 1 to approximately 24 hours while the temperature of the reaction mixture is maintained at a temperature of from approximately 35 to approximately 70° C., and more preferably from approximately 40 to approximately 50° C., under continuously stirring.

After completing the reaction, the temperature is decreased to approximately 40° C. or less, and the reaction mixture is neutralized by adding a weak acid, such as acetic acid, formic acid, lactic acid, asparaginic acid, benzoic acid, succinic acid, oxalic acid, citric acid and propionic acid. Thereafter, the product is collected by filtration or the like and then washed with a solvent to provide the target porous cellulose gel.

In alternative, the porous cellulose gel that satisfies the characteristics shown in the chapter 1, Porous Cellulose Gel of the invention, can be obtained in such a manner that the total amount of the crosslinking agent and the alkali used is divided into n portions (wherein n is an integer of from 2 to 4), and the adding step is repeated n times for each portion. In this case, the number of times for repeating the step is from 2 to 4, preferably from 2 or 3, and more preferably 2. In the case, for example, that they are added after dividing into two portions, the using amounts of the crosslinking agent and the alkali are divided into two portions, and the step of adding each of them over approximately 3 hours or more is repeated twice, whereby the linear velocity of the resulting porous cellulose gel is considerably improved.

In the case where the step is repeated n times, the total amount of the crosslinking agent used is from approximately 4 to approximately 12 times, preferably from approximately 6 to approximately 12 times, more preferably from approximately 6 to approximately 10 times, and further preferably from approximately 6 to approximately 9 times, the amount of the cellulose monomer in terms of moles, and the total amount of the alkali used is from approximately 0.1 to approximately 1.5 times, preferably from approximately 0.5 to approximately 1.25 time, and more preferably from approximately 0.75 to approximately 1 time, the amount of the crosslinking agent in terms of moles.

According to the invention, the porous cellulose gel can be obtained in the manner having been described. In a preferred embodiment of the invention, the porous cellulose gel thus obtained can have the characteristics shown in the chapter 1, Porous Cellulose Gel of the invention.

3. Use of Porous Cellulose Gel

The porous cellulose gel of the invention thus obtained has a high mechanical strength and is excellent in resistance to flow, and therefore the gel can be favorably used as a filler for chromatography.

The filler for chromatography of the invention can be applied to various kinds of chromatography, such as affinity chromatography, ion exchange chromatography, hydrophobic interaction chromatography, reverse phase chromatography, chelate chromatography and covalent bond chromatography. In particular, the porous cellulose gel that has an exclusion limit molecular weight with polyethylene glycol of approximately 1,000,000 or more exhibits a high resolution of polymer substances, such as proteins and nucleic acids, suffers less nonspecific adsorption to the polymer substances, and is excellent in safety, and therefore the gel can be favorably used particularly for affinity chromatography, ion exchange chromatography, hydrophobic interaction chromatography, chelate chromatography and covalent bond chromatography.

The porous cellulose gel of the invention has such a mechanical strength that withstands various reactions, and therefore the invention can provide a porous cellulose gel derivative containing the porous cellulose gel as a base material, in which hydroxyl groups of the porous cellulose gel are substituted at least partially with reactive functional groups. Examples of the hydroxyl groups in gel that may be substituted by the reactive functional groups include those derived from the cellulose and the crosslinking agent. According to the invention, affinity to a target compound can be imparted corresponding to the kind and the introduced amount of the reactive functional groups. Therefore, the resulting porous cellulose gel derivative can be favorably used as a filler for chromatography.

For example, in one embodiment of the invention, at least a part of hydroxyl groups of the porous cellulose gel of the invention are subjected to a sulfation treatment to introduce sulfuric acid groups to the porous cellulose gel, whereby such a filler for chromatography can be provided that is favorably applied to separation or purification of a protein, such as lysozyme, immunoglobulin and blood coagulation factor.

The method for introducing sulfuric acid groups to the porous cellulose gel of the invention, i.e., the method for providing a sulfated porous cellulose gel, is not particularly limited, and can be attained, for example, in the following manner.

A sulfating agent is prepared in a reaction vessel. The sulfating agent used in the invention is not particularly limited as far as it reacts with hydroxyl groups in the porous cellulose gel to introduce sulfuric acid groups into the gel. Examples thereof include a chlorosulfonic acid-pyridine complex, piperidine-N-sulfuric acid, a sulfuric anhydride-dimethylformamide complex, a sulfur trioxide-pyridine complex, a sulfur trioxide-trimethylamine complex and a sulfuric acid-trimethylamine composite. The amount of the sulfating agent used may be arbitrarily selected depending on the target degree of introduction of sulfuric groups and the reaction conditions, and is suitably from 0.001 to 1 equivalent weight based on the hydroxyl groups in the porous cellulose gel.

The porous cellulose gel having been dried is then added to the sulfating agent to effect sulfating reaction. The reaction temperature and the reaction time vary depending on the kinds of a solvent and the sulfating agent. The reaction is generally carried out in an inert gas at a temperature of from approximately 0 to approximately 100° C., and preferably from approximately 20 to approximately 85° C., preferably from approximately 0.5 to approximately 24 hours, and more preferably from approximately 0.5 to approximately 10 hours.

After completing the reaction, the reaction mixture may be neutralized by adding an alkali aqueous solution, such as a sodium hydroxide aqueous solution, thereto.

Thereafter, the resulting product is collected by subjecting the resulting reaction mixture to filtration or centrifugal separation, and then washed with water until reaching neutral, whereby the target sulfated porous cellulose gel can be obtained. The amount of the sulfuric acid groups introduced into the sulfated porous cellulose gel can be controlled, for example, by changing the amount of the sulfating agent used, and can be appropriately determined depending on purposes, such as a filler for chromatography.

In another embodiment of the invention, at least a part of hydroxyl groups of the porous cellulose gel of the invention are subjected to a sulfonation treatment to introduce groups containing a sulfonic acid group to the porous cellulose gel, whereby such a filler for strong cationic ion exchange chromatography can be provided that is favorably applied to separation or purification of a protein, such as immunoglobulin and lysozyme.

The groups containing a sulfonic acid group that can be introduced into the porous cellulose gel of the invention are not particularly limited as far as they are hydrocarbon groups containing a sulfonic acid group, in which a hydrogen atom contained in the groups containing a sulfonic acid group may be substituted by a substituent, such as a hydroxyl group, a halogen atom and an epoxy group. In particular, the groups containing a sulfonic acid group introduced in the invention are preferably sulfoalkyl groups that have from 1 to 5 carbon atoms and may have a substituent.

The method for introducing the groups containing a sulfonic acid group into the porous cellulose gel of the invention is not particularly limited as far as it is ordinarily used for sulfonation treatment of polysaccharide. Examples of the method include methods of treating the porous cellulose gel of the invention with a sulfonating agent, for example, a haloalkanesulfonic acid sodium salt, such as sodium 3-chloro-2-hydroxypropanesulfonate and sodium 3-bromopropanesulfonate, and a sulfonic acid having epoxide used in the examples described later, such as 1,4-butanesultone, 1,3-propanesultone and 1,2-epoxyethanesulfonic acid.

The amount of the groups containing a sulfonic acid groups introduced into the sulfonated porous cellulose gel can be controlled, for example, by changing the amounts of the sulfonating agent and an alkali used, and can be appropriately determined depending on purposes, such as a filler for chromatography.

The method for sulfonating the porous cellulose gel is described in detail in Examples 10-1 to 10-3 described later. The target groups containing a sulfonic acid group can be introduced in a target amount by appropriately designing and changing the experimental conditions with reference to Japanese Laid-Open Patent Publication No. 2001-302702 or Japanese Laid-Open Patent Publication No. Hei 9-235301.

The invention will be described in more detail below with reference to examples, but the invention is not construed as being limited to the examples.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Example 1

In Example 1, porous cellulose gels were investigated for change in resistance to flow upon changing the addition method of a crosslinking agent and an alkali.

1. Preparation of Spherical Cellulose Particles

In Test Example 1, spherical cellulose particles as a raw material for the porous cellulose gel were produced.

Test Example 1

Production of Spherical Cellulose Particles

Spherical cellulose particles were produced in the following manner according to the method disclosed in Japanese Laid-Open Patent Publication No. Sho 55-44312.

(1) 64 g of crystalline cellulose (Ceolus (registered trademark), PH101, available from Asahi Kasei Chemicals Corporation) was added to 1,000 g of 60% by weight aqueous solution of potassium thiocyanate, and dissolved by heating to 110 to 120° C.

(2) The resulting solution was added dropwise to 4,800 mL of o-dicholorobenzene preheated to 130 to 140° C., containing 6 g of surfactant (sorbitan monooleate). Then, the resulting mixture was dispersed by stirring at 200 to 300 rpm.

(3) The resulting dispersion liquid was cooled to 40° C. or less and poured into 1,900 mL of methanol to provide a suspension liquid of particles.

(4) The suspension liquid was separated by filtration, and the particles were washed with 1,900 mL of methanol, followed by separating by filtration. The washing operation was repeated several times.

(5) The particles were washed with a large amount of water to provide the target spherical cellulose particles.

(6) The spherical cellulose particles were sieved to provide a target particle size range (50 to 100 μm). The resulting spherical cellulose particles were in the form of a gelled product swollen with water, and the swelling degree thereof was 16 mL/g.

2. Production of Porous Cellulose Gel

Porous cellulose gels were similarly produced from the resulting spherical cellulose particles using a crosslinking agent in an amount of 6 times the amount of the cellulose monomer in terms of moles and an alkali in an amount of 1.5 times the amount of the crosslinking agent in terms of moles with variation of the addition period of time and the addition distance.

Example 1-1

Production of Porous Cellulose Gel A (1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring. The initial alkali concentration [NaOH] was 0.69% (w/w).

(3) 48 g of a 45% by weight NaOH aqueous solution and 33 g of epichlorohydrin (ECH) were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 103 g of a target porous cellulose gel A.

Example 1-2

Production of Porous Cellulose Gel B (1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring.

(3) 48 g of a 45% by weight NaOH aqueous solution and 33 g of ECH were divided into 13 equal portions, and the portions were each added to the mixture with an interval of 15 minutes over about 3 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 103 g of a target porous cellulose gel B.

Example 1-3

Production of Porous Cellulose Gel C (1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring.

(3) 48 g of a 45% by weight NaOH aqueous solution and 33 g of ECH were divided into 7 equal portions, and the portions were each added to the mixture with an interval of 60 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 99 g of a target porous cellulose gel C.

Example 1-4

Production of Porous Cellulose Gel D (1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring.

(3) 48 g of a 45% by weight NaOH aqueous solution and 33 g of ECH were divided into 4 equal portions, and the portions were each added to the mixture with an interval of 120 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 103 g of a target porous cellulose gel D.

Example 1-5

Production of Porous Cellulose Gel E (1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring. The initial alkali concentration [NaOH] was 0.69% (w/w).

(3) 48 g of a 45% by weight NaOH aqueous solution and 33 g of ECH were divided into 25 equal portions, and the portions were each added to the mixture with an interval of 15 minutes over about 3 hours (12 times), and the balance of the portions were added thereto at one time after lapsing 30 minutes, under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 101 g of a target porous cellulose gel E.

Comparative Example 1

(1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring.

(3) 48 g of a 45% by weight NaOH aqueous solution and 33 g of ECH were divided into 5 equal portions, and the portions were each added to the mixture with an interval of 15 minutes over about 1 hour under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 104 g of a target porous cellulose gel.

Comparative Example 2

(1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of $NaBH_4$ were added to the mixture, followed by stirring.

(3) 48 g of a 45% by weight NaOH aqueous solution and 33 g of ECH were added to the mixture under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 103 g of a target porous cellulose gel.

Comparative Example 3

(1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of $NaBH_4$ were added to the mixture, followed by stirring. The initial alkali concentration [NaOH] was 0.69% (w/w).

(3) 48 g of a 45% by weight NaOH aqueous solution and 33 g of ECH were divided into 25 equal portions, and the portions were each added to the mixture with an interval of 15 minutes over about 1 hours (4 times), and the balance of the portions were added thereto at one time after lapsing 30 minutes, under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 101 g of a target porous cellulose gel.

Comparative Example 4

(1) 100 g of the spherical cellulose particles obtained in Test Example 1 were added to 125 mL of heptane containing 0.35 g of a surfactant (compound name: tetradecyldimethylbenzyl ammonium chloride) and 30 mg of $NaBH_4$, and dispersed by stirring, and the temperature of the mixture is set at 30° C.

(2) 28 g of a 29% by weight NaOH aqueous solution was added to the mixture, followed by stirring at 30° C. for 2 hours. The initial alkali concentration [NaOH] was 7% (w/w).

(3) The temperature of the mixture was increased to 40° C., to which 17 g of ECH was added, and further the reaction was carried out for 16 hours at a temperature increased to 50° C.

(4) 16 g of a 50% by weight NaOH aqueous solution was added to the mixture, followed by mixing at 50° C. for 2 hours.

(5) 17 g of ECH was added to the mixture, followed by mixing at 50° C. for 4 hours.

(6) 16 g of a 50% by weight NaOH aqueous solution was added to the mixture, followed by mixing at 50° C. for 2 hours.

(7) 17 g of ECH was added to the mixture, followed by mixing at 50° C. for 4 hours.

(8) The temperature was decreased to 40° C. or less, and the mixture was neutralized by adding 5 g of acetic acid.

(9) The reaction mixture was filtered to collect the resulting gel, which was washed with pure water by filtering until heptane odor disappeared to provide a target porous cellulose gel.

Comparative Example 5

(1) 100 g of the spherical cellulose particles obtained in Test Example 1 were added to 350 mL of heptane containing 0.75 g of a surfactant, 13 g of sodium carbonate and 100 mg of $NaBH_4$, and dispersed by stirring, and the temperature of the mixture is set at 30° C.

(2) 246 g of a 7% by weight NaOH aqueous solution was added to the mixture, followed by stirring at 30° C. for 2 hours. The initial alkali concentration [NaOH] was 5% (w/w).

(3) The temperature of the mixture was increased to 40° C., to which 17 g of ECH was added, and further the reaction was carried out for 4 hours at a temperature increased to 50° C.

(4) The temperature was decreased to 40° C. or less, and the mixture was neutralized by adding 5 g of acetic acid.

(5) The reaction mixture was filtered to collect the resulting gel, which was washed with pure water by filtering until heptane odor disappeared to provide 106 g of a target porous cellulose gel.

3. Relationship between Pressure and Linear Velocity of Porous Cellulose Gel

The relationships between the pressure and the linear velocity of the porous cellulose gels obtained in Examples 1-1 to 1-5 and Comparative Examples 1 to 5 were obtained in the following manner. For comparison, the relationships between the pressure and the linear velocity of the spherical cellulose particles obtained in Test Example 1 and "MabSelect" produced by GE Healthcare Bio-Sciences Co., Ltd. were also obtained.

Relationship Between Pressure and Linear Velocity

The porous cellulose gels obtained in Examples and Comparative Examples were each filled in a polycarbonate chromatography column having an inner diameter of 2.2 cm (Resin Column for Low-pressure Liquid Chromatography, catalog code #166170, produced by Tokyo Rikakikai Co., Ltd.) to a height of 17.5±2.5 cm. Pure water at 20° C. was passed through the column, at which the pressure was measured at the inlet and the outlet of the column. Upon passing the pure water, the flow rate was 20 mL/minute or less at the initial state and was then increased stepwise, and the pressure was measured after lapsing 3 to 5 minutes after starting the passage of water. The pressure was calculated by subtracting the pressure at the outlet from the pressure at the inlet. The linear velocity was calculated by the following expression.

linear velocity (cm/hour)=flow rate on measurement (mL/hour)/cross sectional area of column ($cm^2$)

The results obtained are shown in FIG. 1. As apparent from FIG. 1, a linear velocity equivalent to "MabSelect" produced by GE Healthcare Bio-Sciences Co., Ltd., which was known as a hard polysaccharide gel, was obtained by adding dividedly over 3 hours. In the case of adding dividedly over 6 hours, the linear velocity was considerably improved. On the other hand, the porous cellulose gels of Comparative Examples 1 to 5 failed to exhibit a desired linear velocity, and some of them suffered decrease in linear velocity below the raw material.

The amounts of the crosslinking agent and the alkali used and the addition method thereof in Examples 1-1 to 1-5 and Comparative Examples 1 to 3 are shown in Table 1.

TABLE 1

| Particles | N/C | E/C | N/E | Addition time | Division number of alkali and crosslinking agent | Addition number of times | Addition interval | Addition method |
|---|---|---|---|---|---|---|---|---|
| Porous cellulose gel A | 9 | 6 | 1.5 | 6 | 25 | 25 | 15 min | adding with constant interval |
| Porous cellulose gel B | 9 | 6 | 1.5 | 3 | 13 | 13 | 15 min | adding with constant interval |
| Porous cellulose gel C | 9 | 6 | 1.5 | 6 | 7 | 7 | 60 min | adding with constant interval |
| Porous cellulose gel D | 9 | 6 | 1.5 | 6 | 4 | 4 | 120 min | adding with constant interval |
| Porous cellulose gel E | 9 | 6 | 1.5 | 3 | 25 | 13 | 15 min | adding by 15 min for 1st to 12th, and adding the balance at one time after 30 min |
| Comparative Example 1 | 9 | 6 | 1.5 | 1 | 4 | 4 | 15 min | adding with constant interval |
| Comparative Example 2 | 9 | 6 | 1.5 | 0 | 1 | 1 | 0 min | adding at one time |
| Comparative Example 3 | 9 | 6 | 1.5 | 1 | 25 | 5 | 15 min | adding by 15 min for 1st to 4th, and adding the balance at one time after 30 min |

N/C: (amount of alkali used)/(amount of cellulose monomer used) (molar ratio)
E/C: (amount of crosslinking agent used)/(amount of cellulose monomer used) (molar ratio)
N/E: (amount of alkali used)/(amount of crosslinking agent used) (molar ratio)

Example 2

In Example 2, porous cellulose gels were investigated for change in resistance to flow upon changing the addition amounts of a crosslinking agent and an alkali.

1. Production of Porous Cellulose Gel

Porous cellulose gels were produced by using a crosslinking agent in an amount of from 3 to 12 times the amount of the cellulose monomer in terms of moles and an alkali in an amount of from 0.5 to 1.6 times the amount of the crosslinking agent in terms of moles, which were divided into 25 equal portions and added dividedly with an interval of 15 minutes over 6 hours.

Example 2-1

Production of Porous Cellulose Gel F (1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of $NaBH_4$ were added to the mixture, followed by stirring. The initial alkali concentration [NaOH] was 0.69% (w/w).

(3) 96 g of a 45% by weight NaOH aqueous solution and 66 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 29 g of acetic acid.

(6) The reaction mixture was filtered to collect the resulting gel, which was washed with pure water by filtering to provide 103 g of a target porous cellulose gel F.

Example 2-2

Production of Porous Cellulose Gel G (1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of $NaBH_4$ were added to the mixture, followed by stirring. The initial alkali concentration [NaOH] was 0.69% (w/w).

(3) 64 g of a 45% by weight NaOH aqueous solution and 67 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 2.6 g of acetic acid.

(6) The reaction mixture was filtered to collect the resulting gel, which was washed with pure water by filtering to provide 105 g of a target porous cellulose gel G Example 2-3

Production of Porous Cellulose Gel H (1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring. The initial alkali concentration [NaOH] was 0.69% (w/w).

(3) 48 g of a 45% by weight NaOH aqueous solution and 50 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 2.6 g of acetic acid.

(6) The reaction mixture was filtered to collect the resulting gel, which was washed with pure water by filtering to provide 103 g of a target porous cellulose gel H.

Example 2-4

Production of Porous Cellulose Gel I (1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring. The initial alkali concentration [NaOH] was 0.69% (w/w).

(3) 32 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 2.6 g of acetic acid.

(6) The reaction mixture was filtered to collect the resulting gel, which was washed with pure water by filtering to provide 100 g of a target porous cellulose gel I.

Example 2-5

Production of Porous Cellulose Gel J (1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring. The initial alkali concentration [NaOH] was 0.69% (w/w).

(3) 32 g of a 45% by weight NaOH aqueous solution and 22 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 11 g of acetic acid.

(6) The reaction mixture was filtered to collect the resulting gel, which was washed with pure water by filtering to provide 103 g of a target porous cellulose gel J.

Example 2-6

Production of Porous Cellulose Gel K (1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring. The initial alkali concentration [NaOH] was 0.69% (w/w).

(3) 24 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 1 g of acetic acid.

(6) The reaction mixture was filtered to collect the resulting gel, which was washed with pure water by filtering to provide 104 g of a target porous cellulose gel K.

Example 2-7

Production of Porous Cellulose Gel L (1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH$_4$ were added to the mixture, followed by stirring. The initial alkali concentration [NaOH] was 0.69% (w/w).

(3) 16 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 1 g of acetic acid.

(6) The reaction mixture was filtered to collect the resulting gel, which was washed with pure water by filtering to provide 99 g of a target porous cellulose gel L.

Comparative Example 6

(1) 100 g of the spherical cellulose particles obtained in Test Example 1 were added to a solution of 63 g of Na$_2$SO$_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH₄ were added to the mixture, followed by stirring. The initial alkali concentration [NaOH] was 0.69% (w/w).

(3) 24 g of a 45% by weight NaOH aqueous solution and 16 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 18.8 g of acetic acid.

(6) The reaction mixture was filtered to collect the resulting gel, which was washed with pure water by filtering to provide 102 g of a target porous cellulose gel.

Comparative Example 7

(1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of NaBH₄ were added to the mixture, followed by stirring. The initial alkali concentration [NaOH] was 0.69% (w/w).

(3) 64 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 26 g of acetic acid.

(6) The reaction mixture was filtered to collect the resulting gel, which was washed with pure water by filtering to provide 97 g of a target porous cellulose gel.

2. Relationship between Pressure and Linear Velocity of Porous Cellulose Gel

Figure 2:
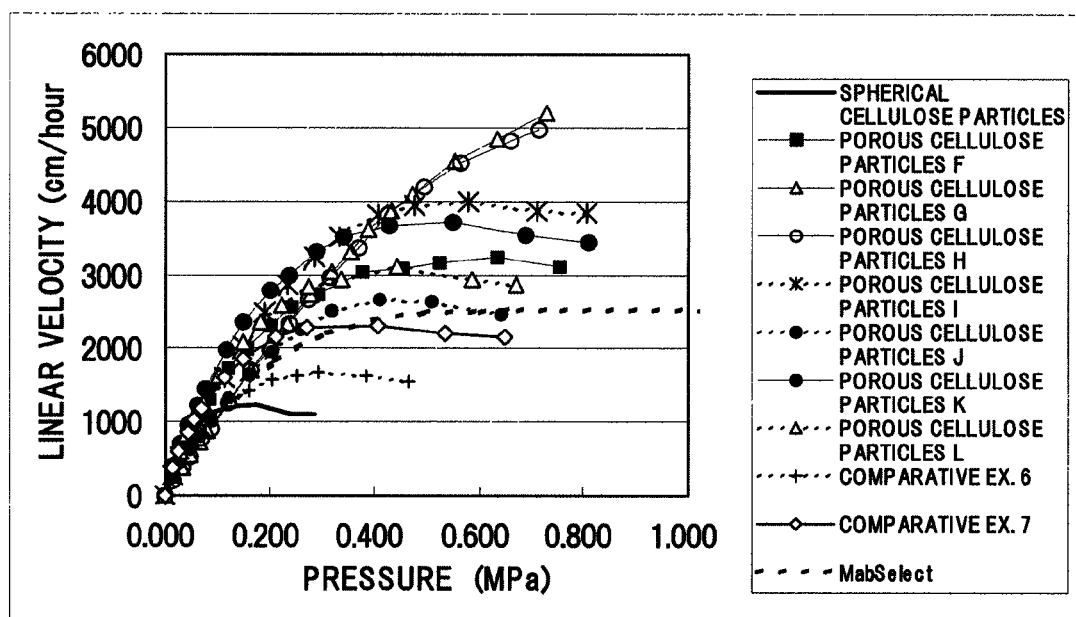
FIG. 2 is a graph showing relationship between the pressure and the linear velocity of the porous cellulose gel obtained in Example 2.

The relationships between the pressure and the linear velocity of the porous cellulose gels obtained in Examples 2-1 to 2-7 and Comparative Examples 6 and 7 were obtained in the same manner as in Example 1. The results obtained as shown in FIG. 2. For comparison, the results for the spherical cellulose particles obtained in Test Example 1 and "MabSelect" produced by GE Healthcare Bio-Sciences Co., Ltd. are also shown in FIG. 2.

As shown in FIG. 2, the linear velocities were improved when the molar ratio of the crosslinking agent to the cellulose monomer was from 4 to 12 times, and the molar ratio of the alkali to the crosslinking agent was 1.5 or less.

The amounts of the alkali and the crosslinking agent used in Examples 2-1 to 2-7 and Comparative Examples 6 and 7 are shown in Table 2.

TABLE 2

| Porous cellulose gel | N/C | E/C | N/E |
|---|---|---|---|
| porous cellulose gel F | 18.0 | 12.0 | 1.5 |
| porous cellulose gel G | 12.0 | 12.0 | 1.0 |
| porous cellulose gel H | 9.0 | 9.0 | 1.0 |
| porous cellulose gel I | 6.0 | 6.0 | 1.0 |
| porous cellulose gel J | 6.0 | 4.0 | 1.5 |

TABLE 2-continued

| Porous cellulose gel | N/C | E/C | N/E |
|---|---|---|---|
| porous cellulose gel K | 4.5 | 6.0 | 0.8 |
| porous cellulose gel L | 3.0 | 6.0 | 0.5 |
| Comparative Example 6 | 4.6 | 3.0 | 1.6 |
| Comparative Example 7 | 12.0 | 6.0 | 2.0 |

N/C: (amount of alkali used)/(amount of cellulose monomer used) (molar ratio)
E/C: (amount of crosslinking agent used)/(amount of cellulose monomer used) (molar ratio)
N/E: (amount of alkali used)/(amount of crosslinking agent used) (molar ratio)

Example 3

In Example 3, porous cellulose gels were investigated for change in resistance to flow upon changing the initial alkali concentration.

1. Production of Porous Cellulose Gel

Porous cellulose gels were produced by in the same manner except that the initial alkali concentration was changed.

(1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 5 g of a 45% by weight NaOH aqueous solution and 0.6 g of NaBH₄ were added to the mixture, followed by stirring. The initial alkali concentration [NaOH] was 1% (w/w).

(3) 46 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 97 g of a target porous cellulose gel M.

Comparative Example 8

(1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 10 g of a 45% by weight NaOH aqueous solution and 0.6 g of NaBH₄ were added to the mixture, followed by stirring. The initial alkali concentration [NaOH] was 2% (w/w).

(3) 41 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 101 g of a target porous cellulose gel.

2. Relationship Between Pressure and Linear Velocity of Porous Cellulose Gel

Figure 3:
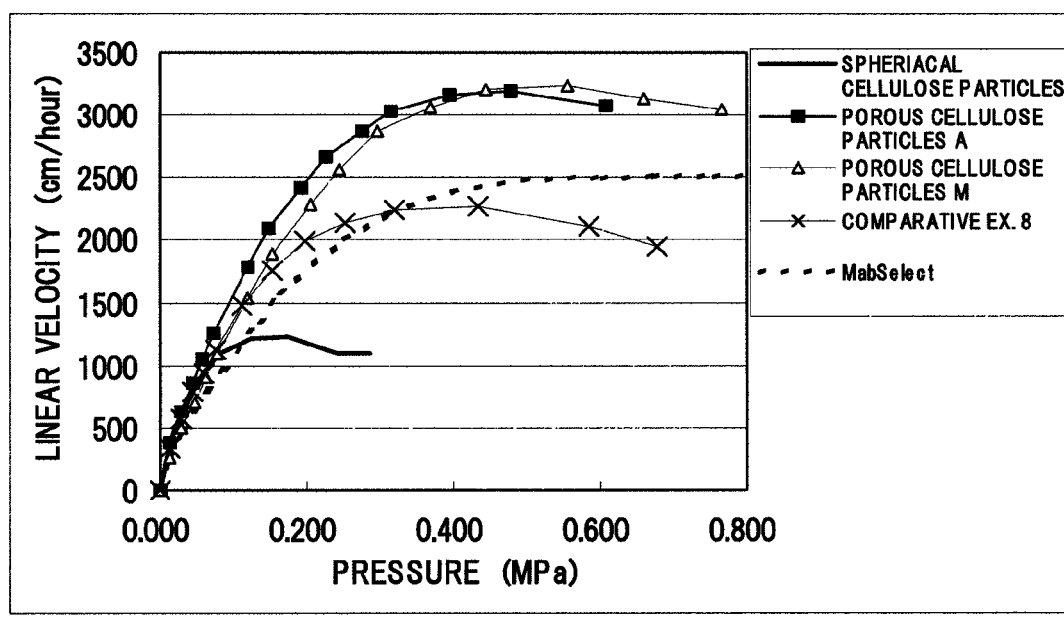
FIG. 3 is a graph showing relationship between the pressure and the linear velocity of the porous cellulose gel obtained in Example 3.

The relationships between the pressure and the linear velocity of the porous cellulose gels obtained in Example 3-1 and Comparative Example 8 were obtained in the same manner as in Example 1. The results obtained as shown in FIG. 3. For comparison, the results for the porous cellulose gel obtained in Example 1-1, which was produced in the same manner as in Example 3-1 except that the initial alkali concentration was changed, the spherical cellulose particles obtained in Test Example 1 and "MabSelect" produced by GE Healthcare Bio-Sciences Co., Ltd. are also shown in FIG. 3. As shown in FIG. 3, considerably good linear velocities were obtained when the initial alkali concentration was 1% by weight or less.

The initial alkali concentrations in Example 3-1, Comparative Example 8 and Example 1-1 are shown in Table 3.

TABLE 3

|  | Example 3-1 | Example 1-1 | Comparative Example 8 |
|---|---|---|---|
| Initial alkali concentration (% by weight) | 1 | 0.69 | 2 |

Example 4

In Example 4, porous cellulose gels were investigated for change in resistance to flow with respect to the amount of sodium sulfate present upon reaction.

1. Production of Porous Cellulose Gel

Porous cellulose gels were produced by in the same manner except that the molar ratio of sodium sulfate to the cellulose monomer was changed.

Example 4-1

Production of Porous Cellulose Gel N (1) 100 g of the spherical cellulose particles obtained in Test Example 1 were added to a solution of 51 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of $NaBH_4$ were added to the mixture, followed by stirring. The initial alkali concentration [NaOH] was 0.69% (w/w).

(3) 48 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 104 g of a target porous cellulose gel N.

Example 4-2

Production of Porous Cellulose Gel O (1) 100 g of the spherical cellulose particles obtained in Test Example 1 were added to a solution of 85 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of $NaBH_4$ were added to the mixture, followed by stirring. The initial alkali concentration [NaOH] was 0.69% (w/w).

(3) 48 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 88 g of a target porous cellulose gel O.

Comparative Example 9

(1) 100 g of the spherical cellulose particles obtained in Test Example 1 were added to a solution of 34 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of $NaBH_4$ were added to the mixture, followed by stirring. The initial alkali concentration [NaOH] was 0.69% (w/w).

(3) 48 g of a 45% by weight NaOH aqueous solution and 33 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 14 g of acetic acid.

(6) The reaction mixture was filtered to collect the resulting gel, which was washed with pure water by filtering to provide 109 g of a target porous cellulose gel.

2. Relationship Between Pressure and Linear Velocity of Porous Cellulose Gel

Figure 4:
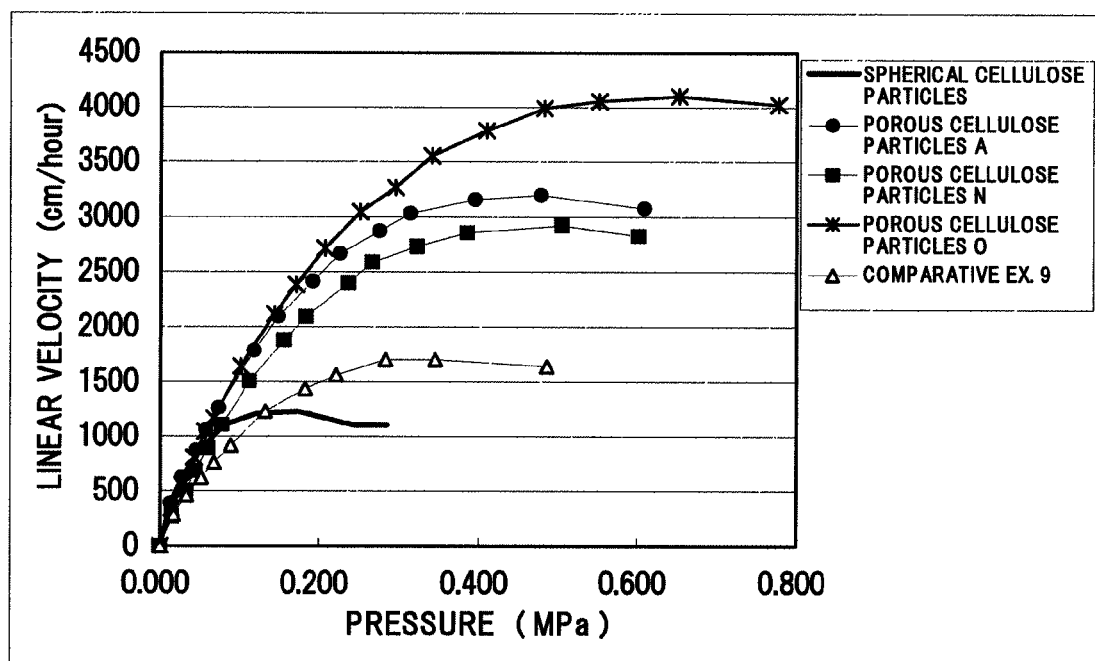
FIG. 4 is a graph showing relationship between the pressure and the linear velocity of the porous cellulose gel obtained in Example 4.

The relationships between the pressure and the linear velocity of the porous cellulose gels obtained in Examples 4-1 and 4-2 and Comparative Example 9 were obtained in the same manner as in Example 1. The results obtained as shown in FIG. 4. For comparison, the results for the porous cellulose gel obtained in Example 1-1, which was produced in the same manner except that the amount of sodium sulfate was changed, and the spherical cellulose particles obtained in Test Example 1 are also shown in FIG. 4.

As shown in FIG. 4, good linear velocities were obtained when the molar ratio of sodium sulfate was 6 times or more the cellulose monomer.

The molar ratios of sodium sulfate to the cellulose monomer in Examples 4-1 and 4-2 and Comparative Example 9 are shown in Table 4.

TABLE 4

| Gel | Sodium sulfate/<br>cellulose monomer |
|---|---|
| porous cellulose gel N | 6 |
| porous cellulose gel O | 10 |
| Comparative Example 9 | 4 |

Example 5

In Example 5, porous cellulose gels were investigated for change in resistance to flow when the crosslinking treatment was repeatedly carried out.

1. Production of Porous Cellulose Gel

Porous cellulose gels were produced by subjecting the porous cellulose gel obtained in Comparative Example 6 to the crosslinking treatment in the same manner repeatedly.

Example 5-1

Production of Porous Cellulose Gel P 100 g of the porous cellulose gel obtained in Comparative Example 6 was again subjected to the crosslinking treatment in the same manner as in Comparative Example 6, and the resulting gel was collected and washed with pure water by filtering in the same manner to provide a target porous cellulose gel P.

Example 5-2

Production of Porous Cellulose Gel Q 100 g of the porous cellulose gel obtained in Example 5-1 was again subjected to the crosslinking treatment in the same manner as in Example 1-1, and the resulting gel was collected and washed with pure water by filtering in the same manner to provide a target porous cellulose gel Q.

Example 5-3

Production of Porous Cellulose Gel R (1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 50° C.

(2) 3.5 g of a 45% by weight NaOH aqueous solution and 0.6 g of $NaBH_4$ were added to the mixture, followed by stirring. The initial alkali concentration [NaOH] was 0.69% (w/w).

(3) 24 g of a 45% by weight NaOH aqueous solution and 16 g of epichlorohydrin were divided into 25 equal portions, and the portions were each added to the mixture with an interval of 15 minutes over about 6 hours under continuously stirring at 50° C.

(4) After completing the addition, the mixture was reacted at a temperature of 50° C. for 16 hours.

(5) After cooling the mixture to 40° C. or less, the mixture was neutralized by adding 9 g of acetic acid.

(6) After neutralizing, the temperature of the mixture was increased to 50° C.

(7) 24 g of a 45% by weight NaOH aqueous solution and 16 g of epichlorohydrin were divided into 25 equal portions, and the portions were each added to the mixture with an interval of 15 minutes over about 6 hours under continuously stirring at 50° C.

(8) After completing the addition, the mixture was reacted at a temperature of 50° C. for 16 hours.

(9) After cooling the mixture to 40° C. or less, the mixture was neutralized by adding 9 g of acetic acid.

(10) The reaction mixture was filtered to collect the resulting gel, which was washed with pure water by filtering to provide 103 g of a target porous cellulose gel R.

2. Relationship Between Pressure and Linear Velocity of Porous Cellulose Gel

The relationships between the pressure and the linear velocity of the porous cellulose gels obtained in Examples 5-1 to 5-3 were obtained in the same manner as in Example 1, and compared to the results for the spherical cellulose particles obtained in Test Example 1. The results obtained as shown in FIG. 5.

Figure 5:
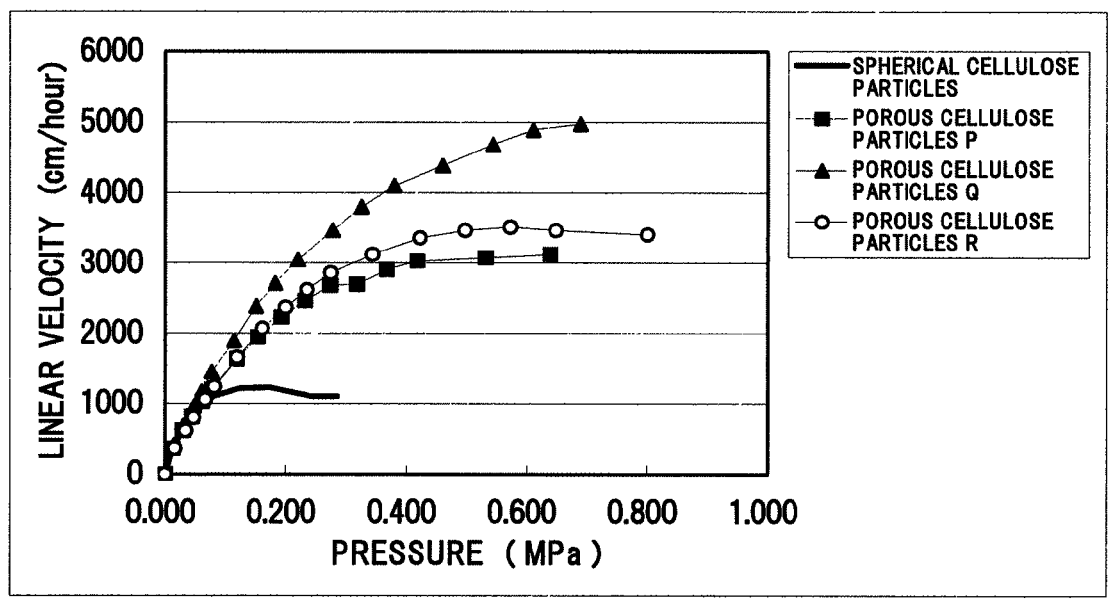
FIG. 5 is a graph showing relationship between the pressure and the linear velocity of the porous cellulose gel obtained in Example 5.

As apparent from FIG. 5, the linear velocity of the porous cellulose gel was considerably improved by carrying out the crosslinking treatment repeatedly.

The amounts of the crosslinking agent used and the total amounts thereof in Examples 5-1 to 5-2, and the amounts of the crosslinking agent used and the total amounts thereof in the two successive crosslinking treatments of Example 5-3 are shown in Table 5.

TABLE 5

| | Example 5-1 | Example 5-2 | Example 5-3 |
|---|---|---|---|
| E/C | 3 | 6 | 3 (successively twice) |
| (total) | 6 | 12 | 6 |

E/C: (amount of crosslinking agent used)/(amount of cellulose monomer used) (molar ratio)

Example 6

In Example 6, porous cellulose gels were investigated for change in resistance to flow upon changing the reaction temperature.

1. Production of Porous Cellulose Gel

A porous cellulose gel was produced by in the same manner as in Example 1-1 except that the reaction temperature was changed to 40° C.

Example 6-1

Production of Porous Cellulose Gel S (1) 100 g of the spherical cellulose particles obtained in Test Example 1 were added to a solution of 63 g of $Na_2SO_4$ dissolved in 132 g of pure water, followed by stirring. The mixture was further stirred for 2 hours continuously at a temperature of 40° C.

(2) 3.5 g of a 45% by weight NaOH aqueous solution and 0.6 g of $NaBH_4$ were added to the mixture, followed by stirring. The initial alkali concentration [NaOH] was 0.69% (w/w).

(3) 48 g of a 45% by weight NaOH aqueous solution and 33 g of epichlorohydrin (ECH) were divided into 25 equal portions, and the portions were each added to the mixture with an interval of 15 minutes over about 6 hours under continuously stirring at 40° C.

(4) After completing the addition, the mixture was reacted at a temperature of 40° C. for 16 hours.

(5) The mixture was neutralized by adding 14 g of acetic acid.

(6) The reaction mixture was filtered to collect the resulting gel, which was washed with pure water by filtering to provide 107 g of a target porous cellulose gel S.

2. Relationship Between Pressure and Linear Velocity of Porous Cellulose Gel

Figure 6:
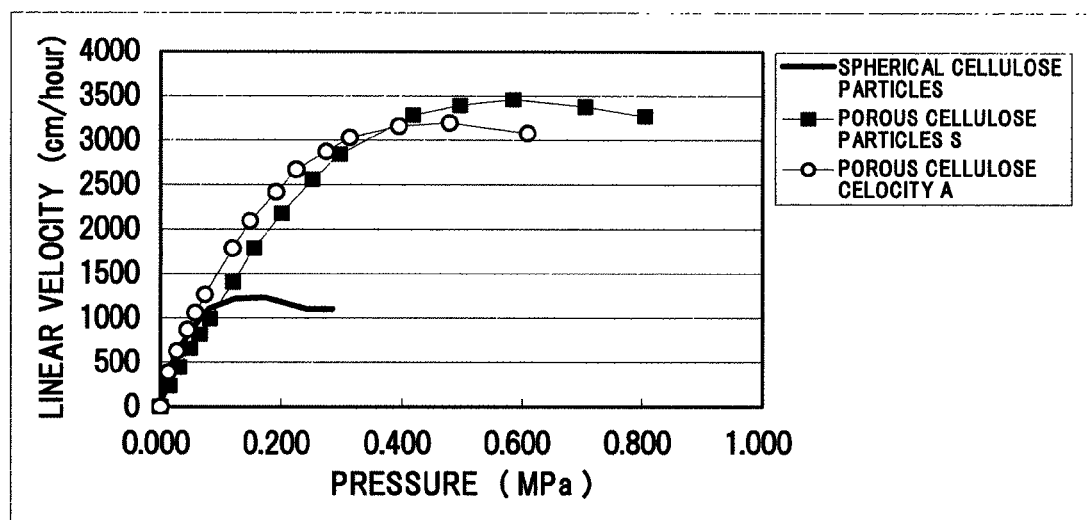
FIG. 6 is a graph showing relationship between the pressure and the linear velocity of the porous cellulose gel obtained in Example 6.

The relationships between the pressure and the linear velocity of the porous cellulose gel obtained in Example 6-1 were obtained in the same manner as in Example 1. The results obtained as shown in FIG. 6. For comparison, the results for the porous cellulose gel obtained in Example 1-1, which was produced in the same manner as in Example 6-1 except that the reaction temperature was changed, are also shown in FIG. 6.

As shown in FIG. 6, the flow rate characteristics of the porous cellulose gel were not changed between the reaction temperatures of 40° C. and 50° C.

The linear velocity at a pressure of 0.4 MPa, the linear velocity per 1 cm of initial gel bed height, the maximum pressure, the maximum linear velocity, the average particle diameter and the maximum linear velocity per 1 cm of initial gel bed height of the porous cellulose gels obtained in Examples 1 to 6 are shown in Tables 6. The average particle diameter was measured in the following manner.

The 1-mm scale of a steel sheet gauge for microscope, NHW-06, available from Nadec Co., Ltd., was imaged with a microscope, VH-8000C, available from Keyence Corporation, at a magnification of 250. A sampling porous cellulose gel dispersed uniformly on a slide glass was imaged with a microscope, VH-8000C, available from Keyence Corporation, at a magnification of 250. The micrograph of the gauge was printed, and the length of the 1-mm length on the gauge was measured with a scale. The micrograph of the sample was printed, and the diameters of the particles were measured with a scale. The actual diameters of the particles were calculated by using the coefficient obtained from the gauge. 100 or more particles were measured, and an average value thereof was designated as the average particle diameter.

TABLE 6

|  | Linear velocity at 0.4 MPa (cm/hour) | Gel bed height (cm) | Maximum pressure (MPa) | Maximum linear velocity (cm/hour) | Initial alkali concentration (% by weight) | N/C | E/C |
|---|---|---|---|---|---|---|---|
| Test Example 1 | — | 16.7 | 0.174 | 1,231 | — | — | — |
| Example 1-1 | 3,150 | 18 | 0.479 | 3,196 | 0.69 | 9 | 6 |
| Example 1-2 | 2,500 | 15.9 | 0.497 | 2,493 | 0.69 | 9 | 6 |
| Example 1-3 | 2,890 | 16.8 | 0.470 | 2,904 | 0.69 | 9 | 6 |
| Example 1-4 | 2,520 | 17.3 | 0.461 | 2,557 | 0.65 | 9 | 6 |
| Example 1-5 | 2,820 | 18.2 | 0.430 | 2,841 | 0.69 | 9 | 6 |
| Comparative Example 1 | 1,800 | 16 | 0.331 | 1,862 | 0.69 | 9 | 6 |
| Comparative Example 2 | <1,000 | 16.9 | 0.198 | 943 | 0.69 | 9 | 6 |
| Comparative Example 3 | <1,400 | 16.2 | 0.238 | 1,515 | 0.69 | 9 | 6 |
| Comparative Example 4 | 1,300 | 15 | 0.440 | 1,337 |  |  |  |
| Comparative Example 5 | <500 | 16.5 | 0.097 | 614 |  |  |  |
| Example 2-1 | 3,050 | 16.3 | 0.635 | 3,235 | 0.69 | 18.6 | 12 |
| Example 2-2 | 3,700 | 17.7 | 0.728 | 5,208 | 0.65 | 12 | 12 |
| Example 2-3 | 3,600 | 17.6 | 0.716 | 4,971 | 0.65 | 9 | 9 |
| Example 2-4 | 3,800 | 16.8 | 0.580 | 3,985 | 0.69 | 6 | 6 |
| Example 2-5 | 2,660 | 17.9 | 0.409 | 2,667 | 0.65 | 6 | 4 |
| Example 2-6 | 3,600 | 17.7 | 0.548 | 3,709 | 0.69 | 4.5 | 6 |
| Example 2-7 | 3,080 | 17 | 0.442 | 3,109 | 0.65 | 3 | 6 |
| Comparative Example 6 | 1,600 | 16.8 | 0.292 | 1,680 | 0.65 | 4.58 | 2.95 |
| Comparative Example 7 | 2,300 | 16.5 | 0.406 | 2,312 | 0.69 | 12 | 6 |
| Example 3-1 | 3,150 | 17.4 | 0.556 | 3,236 | 1 | 9 | 6 |
| Comparative Example 8 | 2,250 | 16.4 | 0.433 | 2,273 | 2 | 9 | 6 |
| Example 4-1 | 2,870 | 17.5 | 0.506 | 2,920 | 0.65 | 9 | 6 |
| Example 4-2 | 3,750 | 17 | 0.652 | 4,104 | 0.65 | 9 | 6 |
| Comparative Example 9 | 1,700 | 16.6 | 0.345 | 1,705 | 0.65 | 9 | 6 |
| Example 5-1 | 3,000 | 16.6 | 0.640 | 3,125 | 0.69 | 4.58 | 2.95 |
| Example 5-2 | 4,200 | 17 | 0.690 | 4,972 | 0.69 | 9 | 6 |
| Example 5-3 | 3,300 | 17 | 0.573 | 3,520 | 0.65 | 9 | 6 |
| Example 6-1 | 3,220 | 17.7 | 0.585 | 3,457 | 0.65 | 9 | 6 |
| MabSelect | 2,400 | 16.8 | 0.495 | 2,478 | — | — | — |

|  | Addition time (hour) | Number of addition | Note | Arithmetic average particle diameter ($M_N$) (μm) | Volume average particle diameter ($M_V$) (μm) | $M_V/M_W$ |
|---|---|---|---|---|---|---|
| Test Example 1 | — | — |  | 96.2 | 105.1 | 1.09 |
| Example 1-1 | 6 | 24 | addition interval of 15 min | 96.4 | 104.9 | 1.09 |
| Example 1-2 | 3 | 24 | addition interval of 15 min | 95.7 | 105.2 | 1.10 |

TABLE 6-continued

| | | | | | | |
|---|---|---|---|---|---|---|
| Example 1-3 | 6 | 7 | addition interval of 60 min | 90.3 | 99.6 | 1.10 |
| Example 1-4 | 6 | 4 | addition interval of 120 min | 93.5 | 103.7 | 1.11 |
| Example 1-5 | 3 | 12 + balance | addition interval of 15 min | 85.5 | 97.1 | 1.14 |
| Comparative Example 1 | 1 | 4 | addition interval of 15 min | 89.9 | 100.5 | 1.12 |
| Comparative Example 2 | 0 | 1 | addition interval of 0 min | 88 | 98.6 | 1.12 |
| Comparative Example 3 | 1 | 4 + balance | addition interval of 15 min | 94.5 | 102.3 | 1.08 |
| Comparative Example 4 | | | | 97.7 | 106.6 | 1.09 |
| Comparative Example 5 | | | | 87.3 | 94.3 | 1.08 |
| Example 2-1 | 6 | 24 | N/E: 1.55 | 90.6 | 100.6 | 1.11 |
| Example 2-2 | 6 | 24 | N/E: 1.0 | 91.4 | 101.0 | 1.11 |
| Example 2-3 | 6 | 24 | N/E: 1.0 | 91.3 | 99.7 | 1.09 |
| Example 2-4 | 6 | 24 | N/E: 1.0 | 90.3 | 103.7 | 1.15 |
| Example 2-5 | 6 | 24 | N/E: 1.5 | 90.3 | 99.2 | 1.10 |
| Example 2-6 | 6 | 24 | N/E: 0.75 | 92.1 | 101.1 | 1.10 |
| Example 2-7 | 6 | 24 | N/E: 0.5 | 98.1 | 106.5 | 1.09 |
| Comparative Example 6 | 6 | 24 | N/E: 1.55 | 89.6 | 97.9 | 1.09 |
| Comparative Example 7 | 6 | 24 | N/E: 2 | 89.6 | 97.9 | 1.09 |
| Example 3-1 | 6 | 24 | | 91.2 | 100.5 | 1.10 |
| Comparative Example 8 | 6 | 24 | | 96.5 | 104.9 | 1.09 |
| Example 4-1 | 6 | 24 | NaS/C: 6 | 90.7 | 101.1 | 1.11 |
| Example 4-2 | 6 | 24 | NaS/C: 10 | 90.8 | 101.0 | 1.11 |
| Comparative Example 9 | 6 | 24 | NaS/C: 4 | 89.1 | 99.9 | 1.12 |
| Example 5-1 | 6 | 24 | recrosslinking Comparative Example 6 | 94.6 | 104.9 | 1.11 |
| Example 5-2 | 6 | 24 | recrosslinking Example 5-1 | 85.9 | 94.4 | 1.10 |
| Example 5-3 | 6 | 24 | crosslinking twice without washing | 87.6 | 99.2 | 1.13 |
| Example 6-1 | 6 | 24 | reaction temperature: 40° C. | 89.9 | 98.4 | 1.09 |
| MabSelect | — | — | | 82.5 | 97.9 | 1.19 |

It was understood from the results shown in Tables 6 that the porous cellulose gels of the invention exhibited resistance to flow that was equivalent to and larger than MabSelect.

Figure 7:
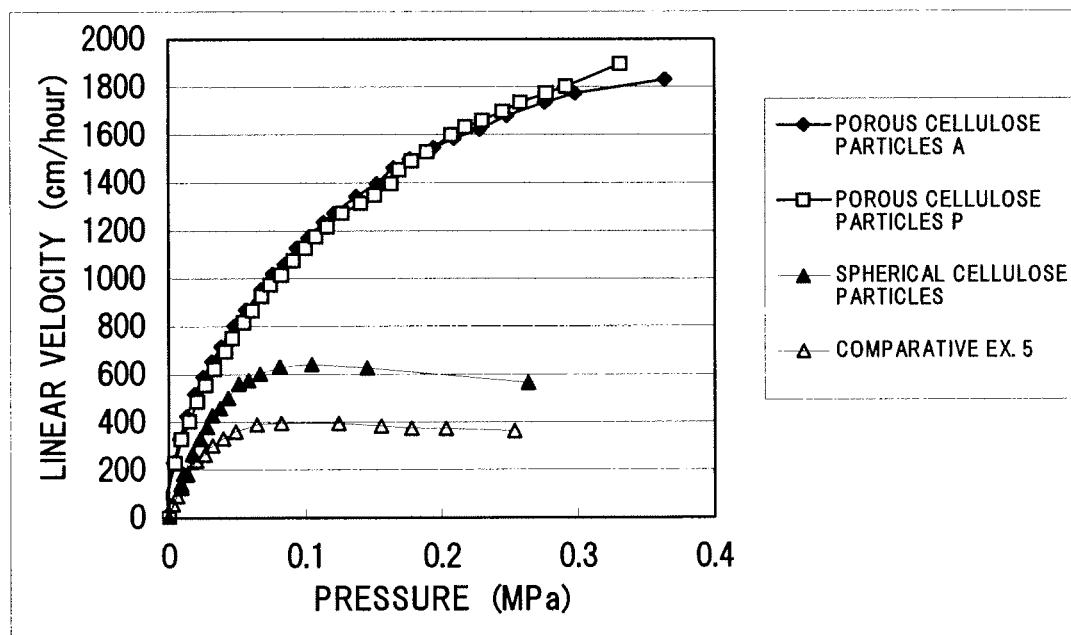
FIG. 7 is a graph showing relationship between the pressure and the linear velocity of the porous cellulose gel when the inner diameter of the column is 9 cm.

Porous cellulose gels obtained in the manner disclosed in Example 1-1 and Example 5-1 where the charged amounts were increased 15 times were filled in an acrylic resin column (catalog code #8701201, produced by Millipore Japan Co., Ltd. (discontinued)) having an inner diameter of 9 cm to a height of 20 cm, through which water at 20° C. was passed. The relationship between the linear velocity with respect to the pressure in these cases are shown in FIG. 7. For comparison, the spherical cellulose particles and the porous cellulose gel of Comparative Example 5 were also produced in the necessary amounts and measured. As shown in FIG. 7, the porous cellulose particles of the invention exhibited good linear velocities even when the inner diameter of the column was 9 cm, and thus it was understood that the flow rate characteristics were maintained with a column having an increased size.

Example 7

In Example 7, the porous cellulose gels obtained in Examples and Comparative Examples were measured for exclusion limit molecular weight. The measurement was carried out in the following manner.

Exclusion Limit Molecular Weight

A gel was filled in a column having an inner diameter of 11 mm to a height of 20 cm, which was equilibrated by passing pure water to stabilize the gel bed.

The column having the gel filled therein was mounted on an HPLC system, Class-VP, produced by Shimadzu Corporation, and was equilibrated by passing pure water. A differential refractometer (IR) was used as a detector.

10 μL of the molecular weight standards shown below were each injected at a flow rate of 0.4 mL/min, and the elution times thereof were measured for calculating Kav values. The molecular weight standard substances were dissolved in pure water to concentrations shown in Table 7. Dextran 2000 was used for obtaining the excluded volume (Vo). As the other molecular weight standards, polyethylene oxide and polyethylene glycol as polymers of ethylene glycol were used. The molecular weights thereof are shown in Table 7.

TABLE 7

| Molecular weight standard | Molecular weight | Concentration (mg/mL) |
|---|---|---|
| Dextran 2000 | 2,000,000 | 3 |
| PEO SE57 | 510,000 | 5 |
| PEO SE15 | 170,000 | 5 |
| PEG | 21,600 | 5 |
| PEG | 11,900 | 5 |

TABLE 7-continued

| Molecular weight standard | Molecular weight | Concentration (mg/mL) |
|---|---|---|
| PEG | 9,200 | 5 |
| PEG | 8,650 | 5 |
| PEG | 4,820 | 5 |
| PEG | 1,450 | 5 |
| PEG | 960 | 5 |
| PEG | 590 | 5 |
| PEG | 220 | 5 |

Dextran 2000: "Dextran 2000", produced by Amaersham Biosciences Corporation
PEO SE57: "Polyethylene oxide", produced by Tosoh Corporation
PEO SE15: "Polyethylene oxide", produced by Tosoh Corporation
PEG: "Polyethylene glycol", produced by Scientific Polymer Products, Inc.

The Kav values were calculated according to the following expression.

$$Kav = (Ve - Vo)/(Vt - Vo)$$

wherein Vo represents the eluted volume of Dextran 2000, Vt represents the volume of the column bed ((cross sectional area of column)×(height of gel)), and Ve represents the eluted volume of the molecular weight standard.

Calculation of Exclusion Limit Molecular Weight

Figure 8:
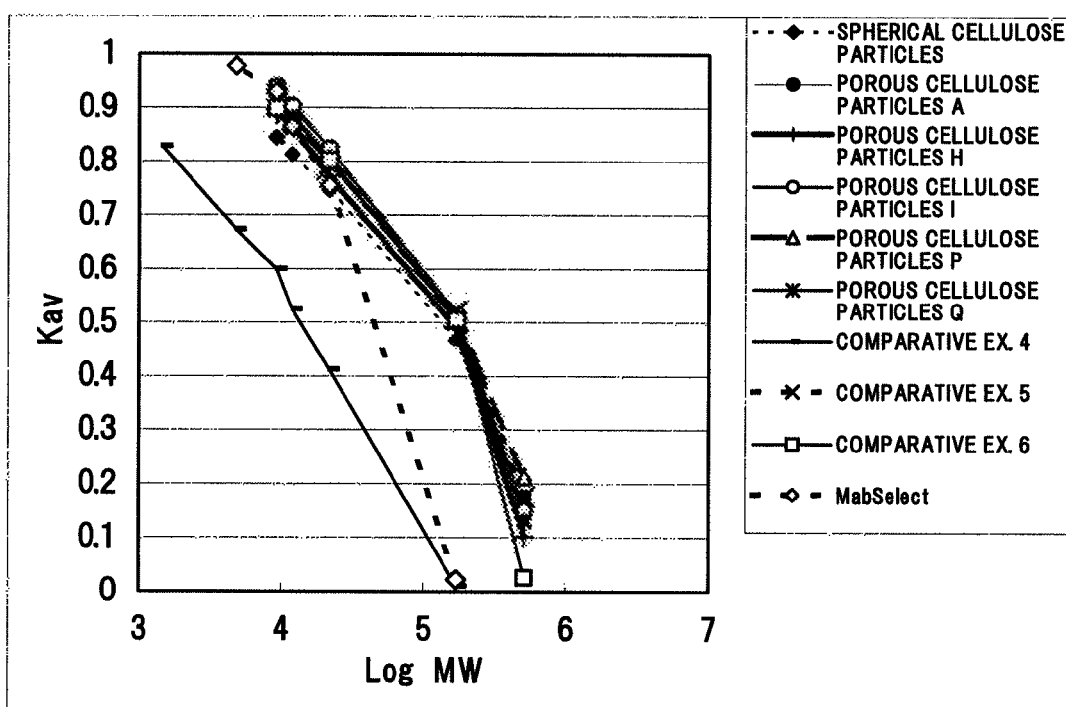
FIG. 8 is a graph showing relationship between logarithm of the molecular weight value based on molecular weight standard as the X axis and the Kav value as the Y axis in the porous cellulose gel obtained in Examples 1 to 6.

In FIG. 8, logarithm of the molecular weight of the molecular weight standard was plotted as the X axis, and the Kav value was plotted as the Y axis. The data in the linear region on the high molecular weight side were applied to a primary expression by the least square method to provide the following expression.

$$Kav = a \cdot \log M_W + b$$

The exclusion limit molecular weight, which is indicated as the intersection point of the X axis and the line of the primary expression, is $\log M_W$ where Kav=0, and thus can be obtained by the following expression.

$$\log(\text{exclusion limit molecular weight}) = b/-a$$

FIG. 8 shows a graph of logarithm of the molecular weight of the molecular weight standard plotted as the X axis and the Kav value plotted as the Y axis. The exclusion limit molecular weights obtained from the expression are shown in Table 8.

As shown in Table 8, the porous cellulose gels of the invention had larger exclusion limit molecular weight than MabSelect having a linear velocity equivalent thereto.

Example 8

In Example 8, the porous cellulose gels of Examples and Comparative Examples were measured for swelling degree and reswelling degree. The measurements were carried out in the following manner.

Measurement of Swelling Degree

About 10 g of a gel was washed with pure water by filtering, suspended in pure water, and deaerated under reduced pressure for about 30 minutes. The resulting suspension liquid was placed in a measuring cylinder and was allowed to stand still for about from 5 to 7 days while being tapped about twice per one day until the sedimentation volume of the gel became constant, and then the sedimentation volume of the gel was measured. After measuring the sedimentation volume of the gel, the total amount of the gel was placed in a beaker and dried in a thermostat chamber at 80° C. for one or two days, and the dry weight of the gel was measured. The swelling degree was obtained by the following expression.

swelling degree (mL/g) = (volume of gel (mL))/(dry weight of gel (g))

Measurement of Reswelling Degree

The dried gel having been used for measuring the swelling degree was again swollen in water, and the volume thereof was measured in the same manner as the measurement of swelling degree. The reswelling degree was obtained by the following expression.

reswelling degree(%) = {(volume of reswollen gel after drying)/(volume of gel before drying)}×100

In the measurement of the swelling degree and the reswelling degree of the gel, the measurement of the volume of the gel was carried out by using the same weight of a dry gel. The results obtained are shown in Table 9.

TABLE 9

| Gel | Swelling degree (mL/g) | Reswelling degree (%) |
|---|---|---|
| spherical cellulose particles | 16 | 19.8 |
| porous cellulose gel A | 12.8 | 96.7 |

TABLE 8

| Experiment No. | Name of sample | a | B | Common logarithm of exclusion limit molecular weight | Exclusion limit molecular weight |
|---|---|---|---|---|---|
| Test Example 1 | Spherical cellulose particles | −0.38 | 2.39 | 6.24 | 1,724,555 |
| Example 1-1 | Porous cellulose gel A | −0.41 | 2.59 | 6.27 | 1,882,019 |
| Example 2-3 | Porous cellulose gel H | −0.42 | 2.59 | 6.14 | 1,373,565 |
| Example 2-4 | Porous cellulose gel I | −0.43 | 2.66 | 6.22 | 1,670,500 |
| Example 5-1 | Porous cellulose gel P | −0.38 | 2.41 | 6.41 | 2,573,446 |
| Example 5-2 | Porous cellulose gel Q | −0.42 | 2.62 | 6.19 | 1,561,084 |
| Comparative Example 4 | Comparative Example 4 | −0.40 | 2.15 | 5.34 | 217,634 |
| Comparative Example 5 | Comparative Example 5 | −0.39 | 2.50 | 6.33 | 2,114,167 |
| Comparative Example 6 | Comparative Example 6 | −0.46 | 2.77 | 6.01 | 1,019,696 |
| MabSelect | MabSelect | −0.51 | 2.86 | 5.57 | 375,012 |

TABLE 9-continued

| Gel | Swelling degree (mL/g) | Reswelling degree (%) |
|---|---|---|
| porous cellulose gel I | 12.9 | 97.3 |
| porous cellulose gel P | 12.8 | 98.7 |
| porous cellulose gel Q | 11.6 | 100.8 |
| Comparative Example 4 | 10.1 | 99.0 |
| Comparative Example 5 | 16.4 | 89.2 |
| Comparative Example 6 | 14.2 | 95.8 |

As shown in Table 9, the porous cellulose gels of the invention exhibited a reswelling degree close to 100%.

Example 9

In Example 9, sulfated porous cellulose gels were produced by introducing sulfuric acid groups into a porous cellulose gel.

1. Production of Sulfated Porous Cellulose Gel

Example 9-1

Production of Sulfated Porous Cellulose Gel A (1) Methanol was added to the porous cellulose gel H obtained in Example 2-3, followed by stirring, and then the gel was collected by filtering. The washing operation was repeated 6 times.

(2) The washed gel was dried under reduced pressure in a dryer at 50° C.

(3) 300 mL of pyridine was cooled to 10° C. or less under stirring, to which 3.5 g of chlorosulfonic acid was then added.

(4) After completing the addition of chlorosulfonic acid, the reaction mixture was reacted at 10° C. or less for 1 hour. Thereafter, the reaction mixture was heated to 65° C.

(5) After the temperature of the reaction mixture reached 65° C., 15 g of the dried gel obtained in (2) was added thereto and reacted for 0.5 hour under stirring.

(6) After completing the reaction, the reaction mixture was neutralized by adding a 20% (w/w) NaOH aqueous solution.

(7) The resulting reaction mixture was filtered to collect the gel, which was washed with pure water until becoming neutral, whereby 118 g of a target sulfated porous cellulose gel A was obtained.

(8) The adsorbed amount of lysozyme measured according to the following manner was 28 mg per 1 mL of the sulfated porous cellulose gel A.

Measurement of Adsorbed Amount of Lysozyme 2 mL of the sulfated porous cellulose gel A was filled in a column having an inner diameter of 7 mm and equilibrated at pH 7 with a 0.01 M phosphate buffer solution and a 0.15 M NaCl aqueous solution. A 0.01 M phosphate buffer solution and a 0.15 M NaCl (pH 7) aqueous solution were added to lysozyme (produced by Seikagaku Corporation) to make a lysozyme concentration of 3.33 mg/mL, followed by dissolving. 30 mL of the lysozyme solution having a concentration of 3.33 mg/mL was circulated in the column for 1 hour.

After completing the circulation, lysozyme that was not adsorbed to the column was washed out with a 0.01 M phosphate buffer solution and a 0.15 M NaCl aqueous solution (pH 7).

Thereafter, lysozyme that was adsorbed to the column was eluted with a 0.01 M phosphate buffer solution and a 0.6 M NaCl aqueous solution (pH 7), and the amount of lysozyme thus eluted was obtained by the light absorbance method. The adsorbed amount of lysozyme was calculated by the following expression.

adsorbed amount of lysozyme=eluted lysozyme amount (mg)

Example 9-2

Production of Sulfated Porous Cellulose Gel B

A sulfated porous cellulose gel B was produced in the same manner as in Example 9-1 except that the amount of chlorosulfonic acid used was changed to 5 g. The adsorbed amount of lysozyme of the sulfated porous cellulose gel B was 38 mg per 1 mL of the sulfated porous cellulose gel B. Accordingly, the lysozyme adsorption capability can be controlled by changing the amount of chlorosulfonic acid used as a sulfating agent.

Comparative Example 10

The spherical cellulose particles of Test Example 1 was dried in the same manner as in Example 9-1, but the spherical cellulose particles remained shrunk and were not be reswollen to such an extent that the particles were able to be used in the subsequent reaction.

Figure 9:
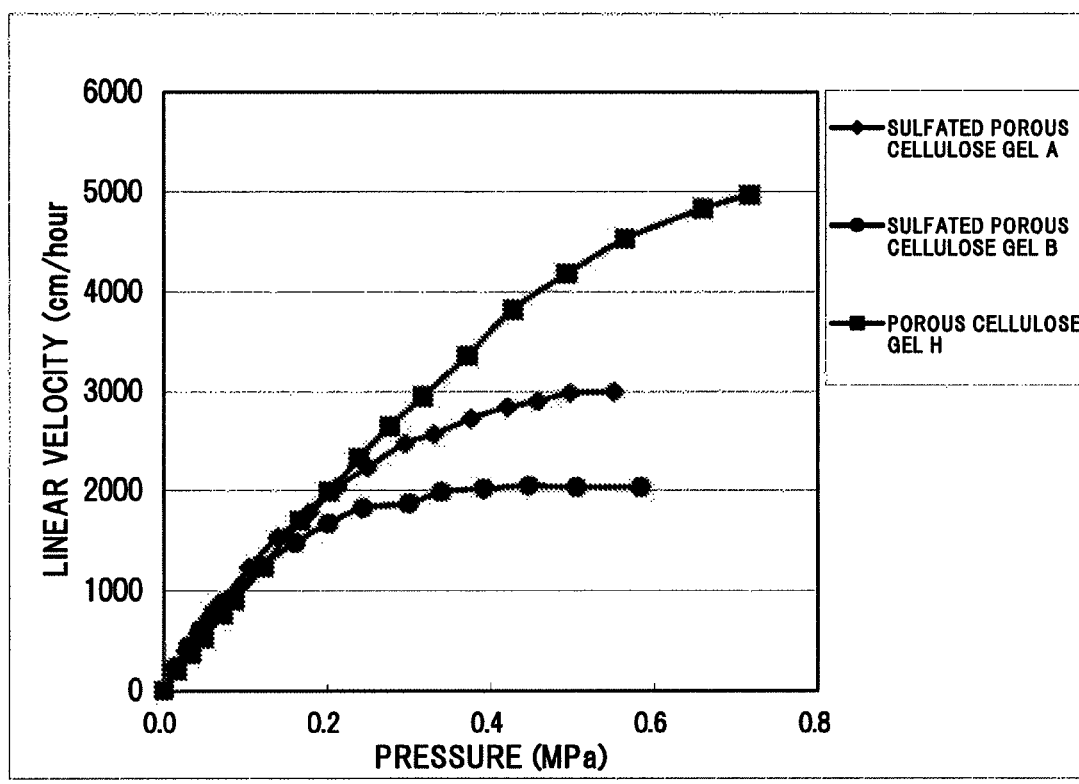
FIG. 9 is a graph showing relationship between the pressure and the linear velocity of the sulfated porous cellulose gel obtained in Example 9.

2. Relationship Between Pressure and Linear Velocity of Sulfated Porous Cellulose Gel The relationships between the pressure and the linear velocity of the sulfated porous cellulose gels obtained in Examples 9-1 and 9-2 were obtained in the same manner as in Example 1. The results obtained as shown in FIG. 9. For comparison, the results for the porous cellulose gel H used as a raw material are also shown in FIG. 9.

As apparent from FIG. 9, the sulfated porous cellulose gels still had a high flow rate characteristics maintained while they were slightly lowered as compared to the porous cellulose gel.

Example 10

In Example 10, sulfonated porous cellulose gels were produced by introducing sulfonic acid groups into a porous cellulose gel.

1. Production of Sulfonated Porous Cellulose Gel

Example 10-1

Production of Sulfonated Porous Cellulose Gel A (1) 100 g of the porous cellulose gel H obtained in Example 2-3, 0.49 g of tetradecyldimethylbenzyl ammonium chloride (produced by NOF Corporation), 0.05 g of sodium borohydride (produced by RohM and Haas) and 215.4 g of a 20% (w/w) sodium hydroxide aqueous solution were placed in a 500-mL separable flask and kept at 20° C.

(2) Immediately after the temperature inside the flask reached 20° C., 41.3 g of 1,4-butanesultone (produced by Wako Pure Chemical Industries, Ltd.) was added, followed by stirring for 16 hours while keeping the temperature inside flask to 20° C.

(3) Thereafter, the temperature was increased to 50° C. over about 1 hour, and after continuously stirring for 4 hours, the content of the flask was cooled to 40° C. or less. At the time when the temperature of the liquid became 40° C. or less, 72.8 g of acetic acid was added while keeping the temperature of the liquid not exceeding 40° C.

(4) Immediately after the addition of acetic acid, the reaction was filtered, and the product was then washed with 200 mL of warm water (30° C.) 5 times, and further washed with 200 mL of 0.5 N hydrochloric acid once.

(5) Thereafter, the product was washed with pure water until the filtrate became neutral, washed with 200 mL of a 0.5 N sodium hydroxide aqueous solution once, and again washed with pure water until the filtrate became neutral, so as to provide a target sulfonated porous cellulose gel A.

The sulfur content in a dried gel of the sulfonated porous cellulose gel A by ICP (inductively coupled plasma) analysis was 4%, and the adsorbed amount of immunoglobulin measured by the following manner was 66.9 mg per mL of the wet gel. The relationship between the pressure and the linear velocity was obtained in the same manner as in Example 1, and the linear velocity was 1,200 cm/hour at a pressure of 0.3 MPa.

Measurement of Immunoglobulin 2 mL of a gel was filled in a column having an inner diameter of 7 mm and equilibrated at pH 4.3 with a 0.01 M acetate buffer solution and a 0.05 M NaCl aqueous solution. A 0.01 M acetate buffer solution and a 0.05 M NaCl aqueous solution (pH 4.3) were added to bovine gamma globulin (produced by Celliance Corporation) to make an immunoglobulin concentration of 10 mg/mL, followed by dissolving.

10 mL of the bovine gamma globulin solution thus prepared was passed through the column. After completing the passage, the column was washed with 15 mL of a 0.01 M acetate buffer solution and a 0.05 M NaCl aqueous solution (pH 4.3), and the liquid was designated as a washout solution. The adsorbed amount of immunoglobulin was calculated by the following expression.

adsorbed amount of immunoglobulin=100 (mg)−(bovine gamma globulin amount in washout solution (mg))

Example 10-2

Production of Sulfonated Porous Cellulose Gel B

A sulfonated porous cellulose gel B was produced in the same manner as in Example 10-1 except that the sulfonating agent was changed from 1,4-butanesultone to 37.0 g of 1,3-propanesultone (produced by Wako Pure Chemical Industries, Ltd.).

The sulfur content in a dried gel of the sulfonated porous cellulose gel B was 1.7%, and the adsorbed amount of immunoglobulin was 43.7 mg per mL of the wet gel. The linear velocity was 1,430 cm/hour at a pressure of 0.3 MPa.

Example 10-3

Production of Sulfonated Porous Cellulose Gel C (1) 100 g of the porous cellulose gel H obtained in Example 2-3 and 80 mL of pure water were placed in a 500-mL separable flask, and the content of the flask was kept at 30° C., followed by stirring for 30 minutes.

(2) Thereafter, 144.7 g of a 7% (w/w) sodium hydroxide aqueous solution was added, followed by stirring for 1 hour while keeping the temperature inside flask to 30° C.

(3) 153.5 g of sodium 3-bromopropanesulfonate (produced by Sigma-Aldrich Corporation) was then added to the flask, followed by stirring for 2 hours at 30° C.

(4) Thereafter, the reaction mixture was filtered, and the product was washed with pure water until the filtrate became neutral to provide a target sulfonated porous cellulose gel C.

The sulfur content in a dried gel of the sulfonated porous cellulose gel C was 0.8%, and the adsorbed amount of immunoglobulin was 39.3 mg per mL of the wet gel. The linear velocity was 3,340 cm/hour at a pressure of 0.3 MPa.

Comparative Example 11

The spherical cellulose particles of Test Example 1 were sulfonated with 1,4-butanesultone (produced by Wako Pure Chemical Industries, Ltd.) in the same manner in Example 10-1, but the spherical cellulose particles failed to maintain the particle shape and were not able to be used as a filler for chromatography.

As having been described, the porous cellulose gel of the invention has such a strength that withstands reaction for introducing reactive functional groups, such as sulfuric acid groups and sulfonic acid groups, whereby reactive functional groups corresponding to purposes can be introduced, and the amount of the groups can be appropriately controlled. Accordingly, the invention can provide a filler for chromatography having a function corresponding to an intended purpose.

The porous cellulose gel of the invention can be favorably used as a filler for various kinds of chromatography. The use of the porous cellulose gel of the invention enhances the production efficiency of a polymer substance, such as a nucleic acid and a protein.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A method for producing porous crosslinked cellulose particles comprising the steps of:
adding continuously dropwise or adding dividedly, to a suspension liquid of non-crosslinked spherical cellulose particles having a sphericity of from approximately 0.8 to approximately 1.0, a crosslinking agent in an amount of from 4 to 12 times an amount of a cellulose monomer in terms of moles and an alkali in an amount of from 0.1 to 1.5 times the amount of the crosslinking agent in terms of moles, in the presence of at least one inorganic salt selected from the group consisting of a hydrochloride, a sulfate, a phosphate and a borate, in an amount of from 6 to 20 times the amount of the cellulose monomer in terms of moles, over 3 hours or more, and
producing crosslinked cellulose particles.

2. The method of claim 1, wherein the amount of the crosslinking agent used is from 4 to 9 times the amount of the cellulose monomer in terms of moles.

3. The method of claim 1, wherein the total amount of the crosslinking agent and the alkali used is divided into n portions (wherein n is an integer of from 2 to 4), and the adding step is repeated n times for each portion, to provide the porous cellulose gel of claims 1.

4. The method as claimed in of claim 3, wherein the total amount of the crosslinking agent used is from 6 to 12 times the amount of the cellulose monomer in terms of moles.

5. The method of claim 1, wherein the suspension liquid of non-crosslinked cellulose particles has an initial alkali concentration of 1% by weight or less.

6. The method of claim 1, wherein the total amount of the crosslinking agent and the alkali used is divided into n portions (wherein n is an integer of from 2 to 4), and the adding step is repeated n times for each portion, wherein the porous cellulose gel comprises crosslinked cellulose particles having a solvent contained therein, upon filling the gel in a chromatography column having an inner diameter of 2.2 cm to a height of 17.5±2.5 cm, a maximum linear velocity of water at 20° C. being from 2,400 to 5,500 cm/hour.

7. The method of claim 6, wherein the total amount of the crosslinking agent used is from 6 to 12 times the amount of the cellulose monomer in terms of moles.

8. The method of claim 1, wherein the total amount of the crosslinking agent and the alkali used is divided into n portions (wherein n is an integer of from 5 to 10), and the adding step is repeated n times for each portion, to provide the porous cellulose gel of claim 1.

* * * * *